United States Patent [19]

Hasegawa

[11] Patent Number: 5,007,719
[45] Date of Patent: Apr. 16, 1991

[54] VARIFOCAL IMAGING OPTICAL SYSTEM HAVING MOIRE ELIMINATING FUNCTION

[75] Inventor: Akira Hasegawa, Tokyo, Japan

[73] Assignee: Olympus Optical Co., Ltd., Tokyo, Japan

[21] Appl. No.: 516,207

[22] Filed: Apr. 30, 1990

[30] Foreign Application Priority Data

Apr. 29, 1989 [JP] Japan .................................. 1-109894

[51] Int. Cl.$^5$ .............................................. G02B 15/14
[52] U.S. Cl. .................................... 350/425; 350/427
[58] Field of Search ................. 350/425, 427, 447, 423

[56] References Cited

U.S. PATENT DOCUMENTS

| | | | |
|---|---|---|---|
| 4,408,841 | 10/1983 | Arai et al. | 350/425 |
| 4,701,033 | 10/1987 | Masumoto | 350/425 |
| 4,756,609 | 7/1988 | Estelle | 350/425 |
| 4,832,465 | 5/1989 | Arai et al. | 350/425 |

Primary Examiner—Jon W. Henry

[57] ABSTRACT

An imaging optical system suitable for imaging an object having a large spectral component at a certain spatial frequency. The imaging optical system includes an imaging lens system for forming an image of an object on a given image plane. The imaging lens system can have different magnifications without changing the positional relationship between the object and the image plane and includes a varifocal lens portion and a front lens portion arranged on the object side of the varifocal lens portion. The imaging lens system satisfies the following condition:

$$|\phi_{3T}| - |\phi_{3W}| \geq 0.8|(Z-1)SA31|$$

where Z is the ratio of the maximum value to the minimum value of the magnification of the imaging lens system; SA31 is the third-order coefficient of spherical abberation of the front lens portion; $|\phi_{3T}|$ is the sum of the third-order coefficients of spherical abberation of the respective lens surfaces of the imaging lens system in the state of the maximum magnification; and $|\phi_{3W}|$ is the sum of the third-order coefficients of spherical aberration of the respective lens surfaces of the imaging lens system in the state of the minimum magnification.

In this imaging optical system, when the image magnification is varied, the magnitude of the spherical aberration caused by the imaging lens system varies with the magnification. Therefore, the variation of the spatial frequency response of the imaging lens corresponding to the variation of the image magnification is smaller than that of usual varifocal lenses so that the effect of spurious signal elimination remains unchanged even if the magnification is varied.

21 Claims, 29 Drawing Sheets

FIG.11 (WIDE)

FIG.12 (TELE)

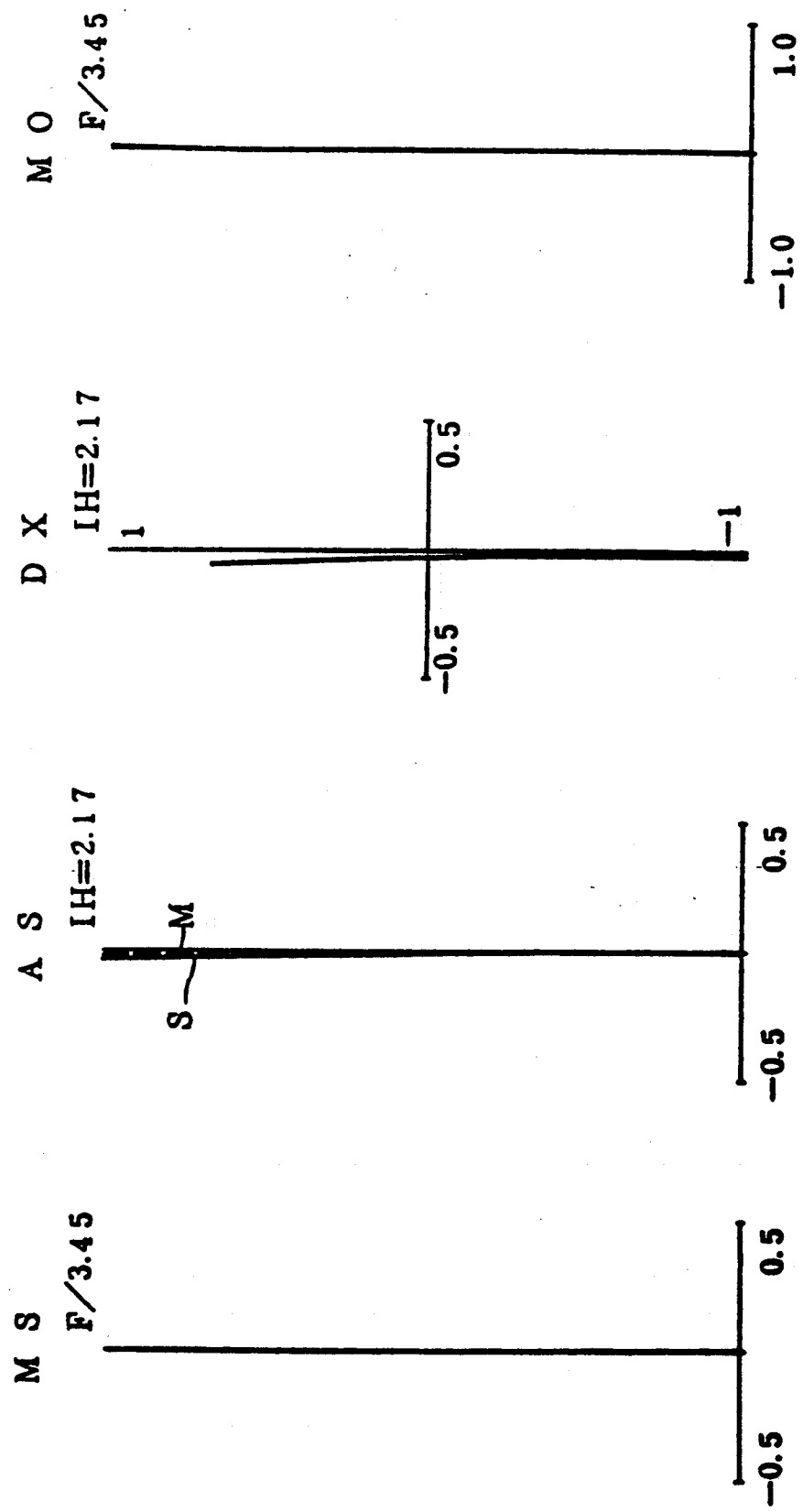
FIG. 14 (WIDE)

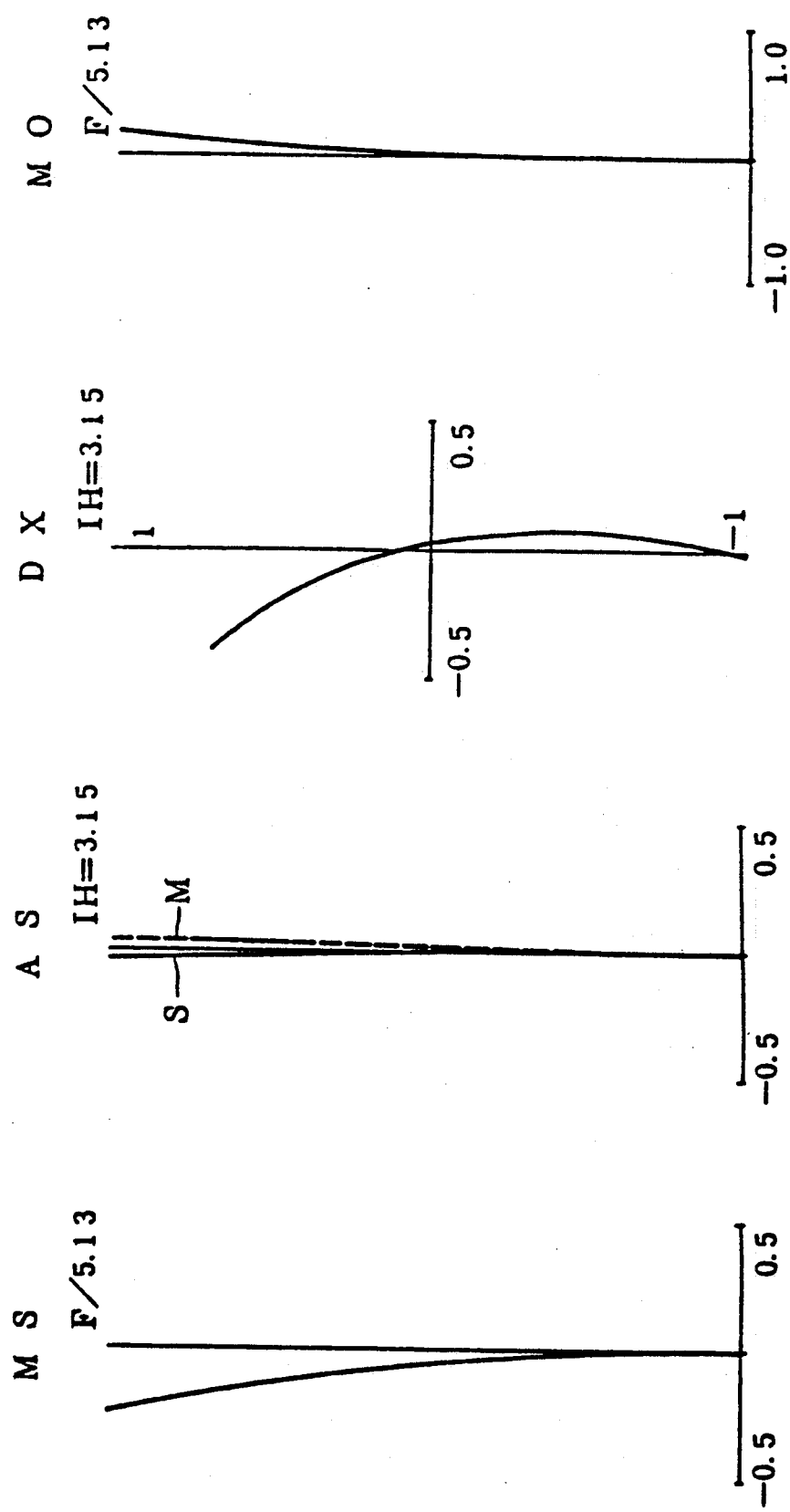
FIG.15 (TELE)

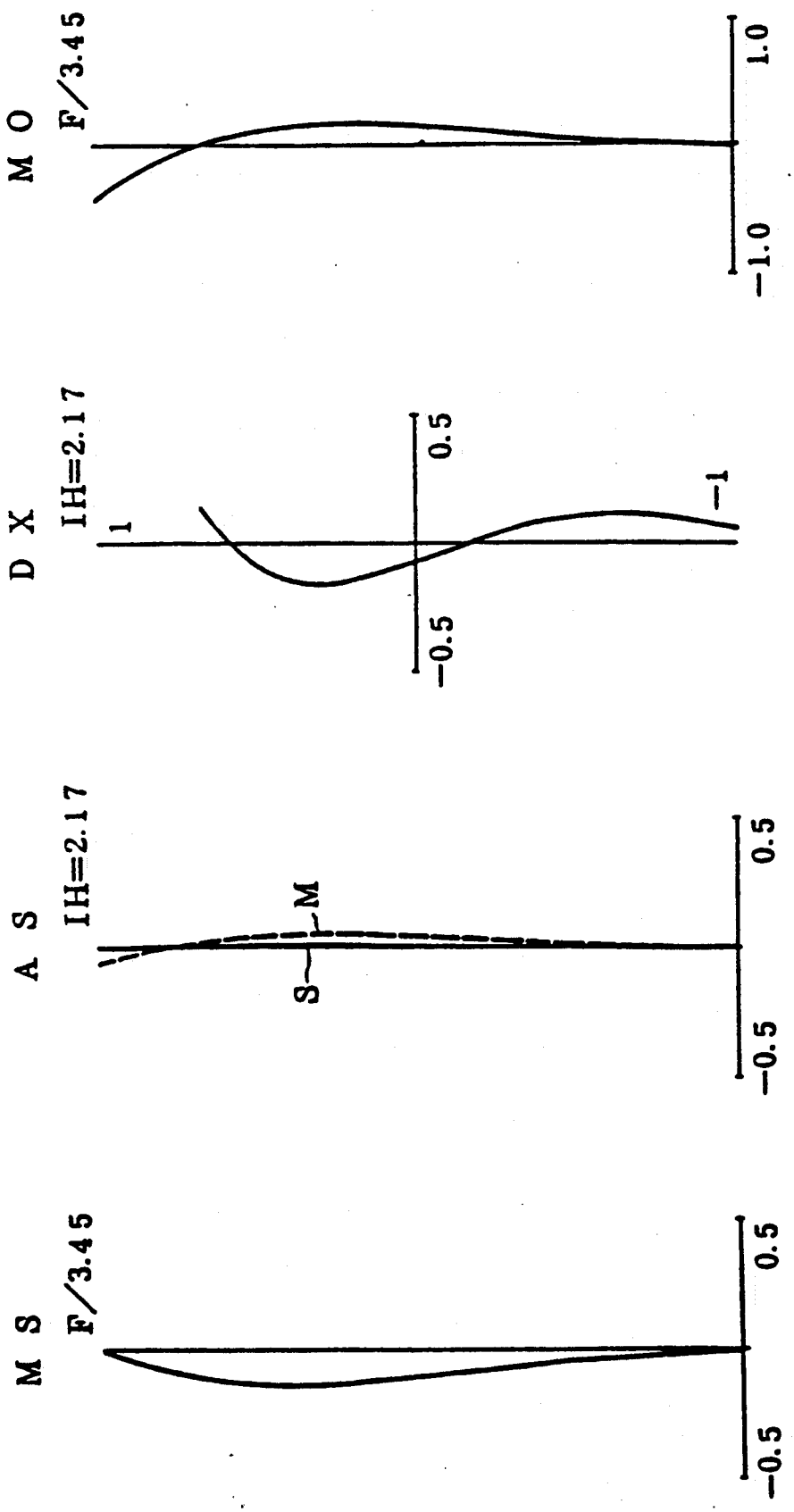
FIG.17 (WIDE)

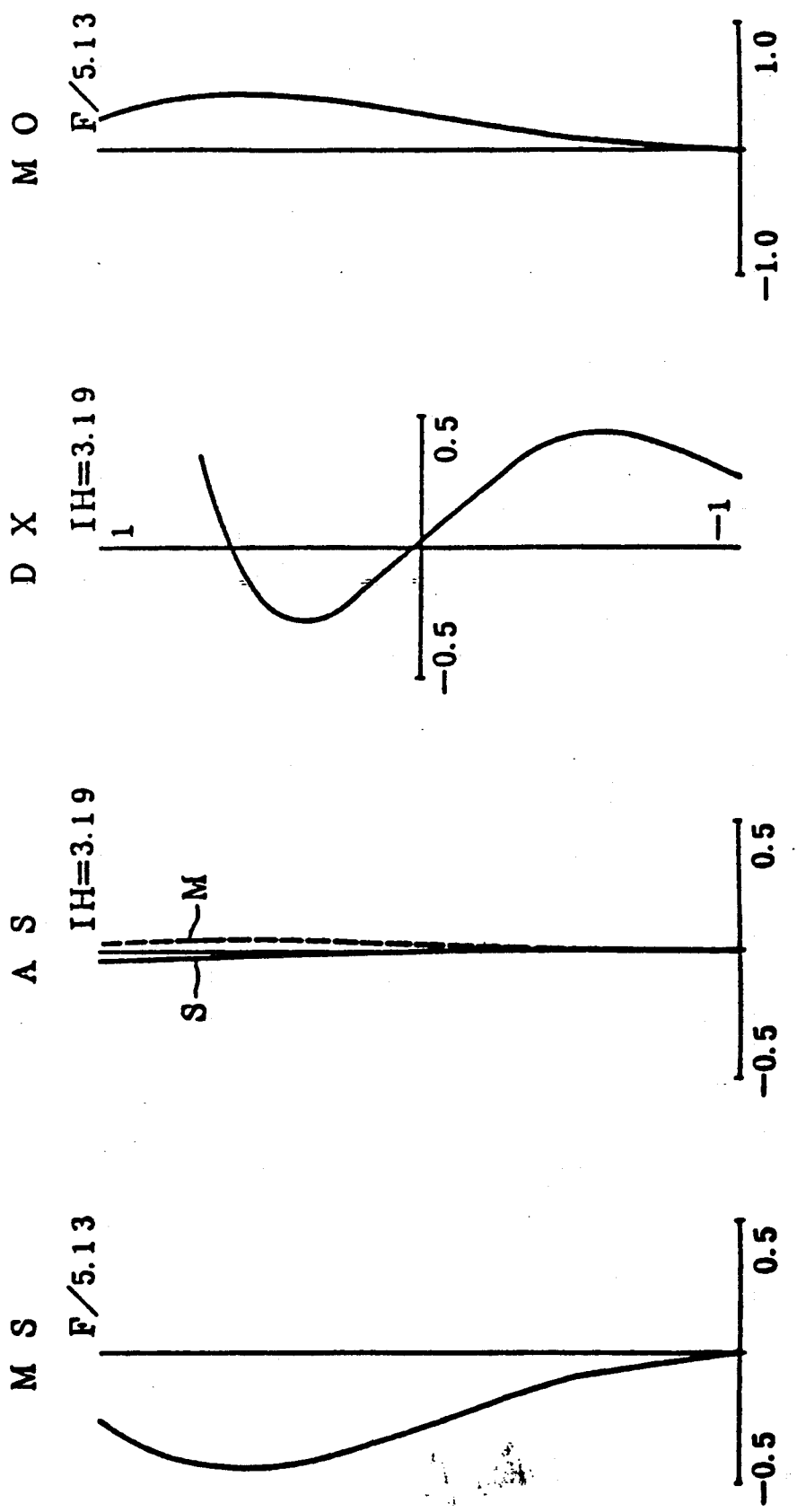
FIG.18 (TELE)

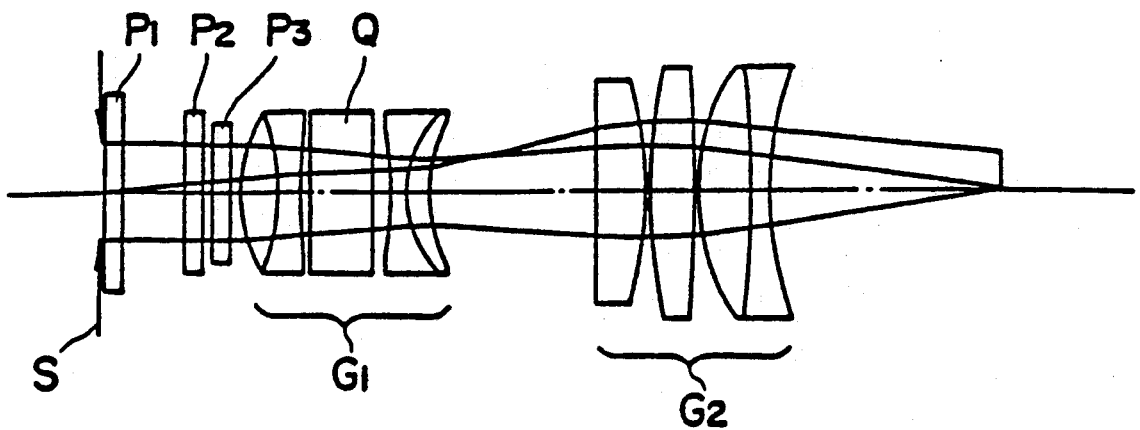
FIG.19(A)
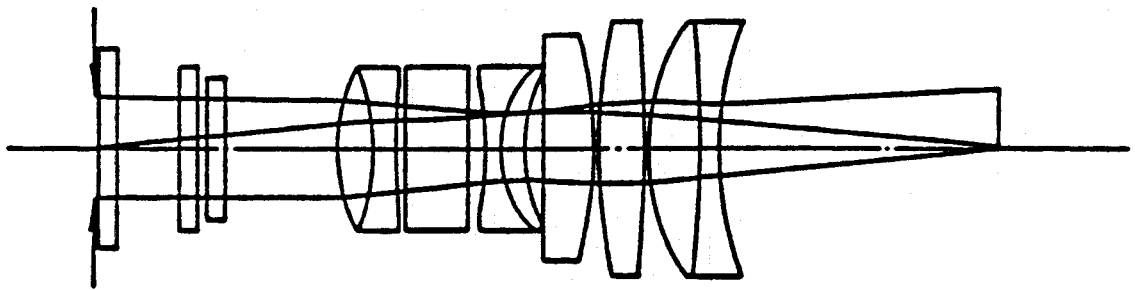
FIG.19(B)
FIG. 19

FIG.20 (WIDE)

FIG.21 (TELE)

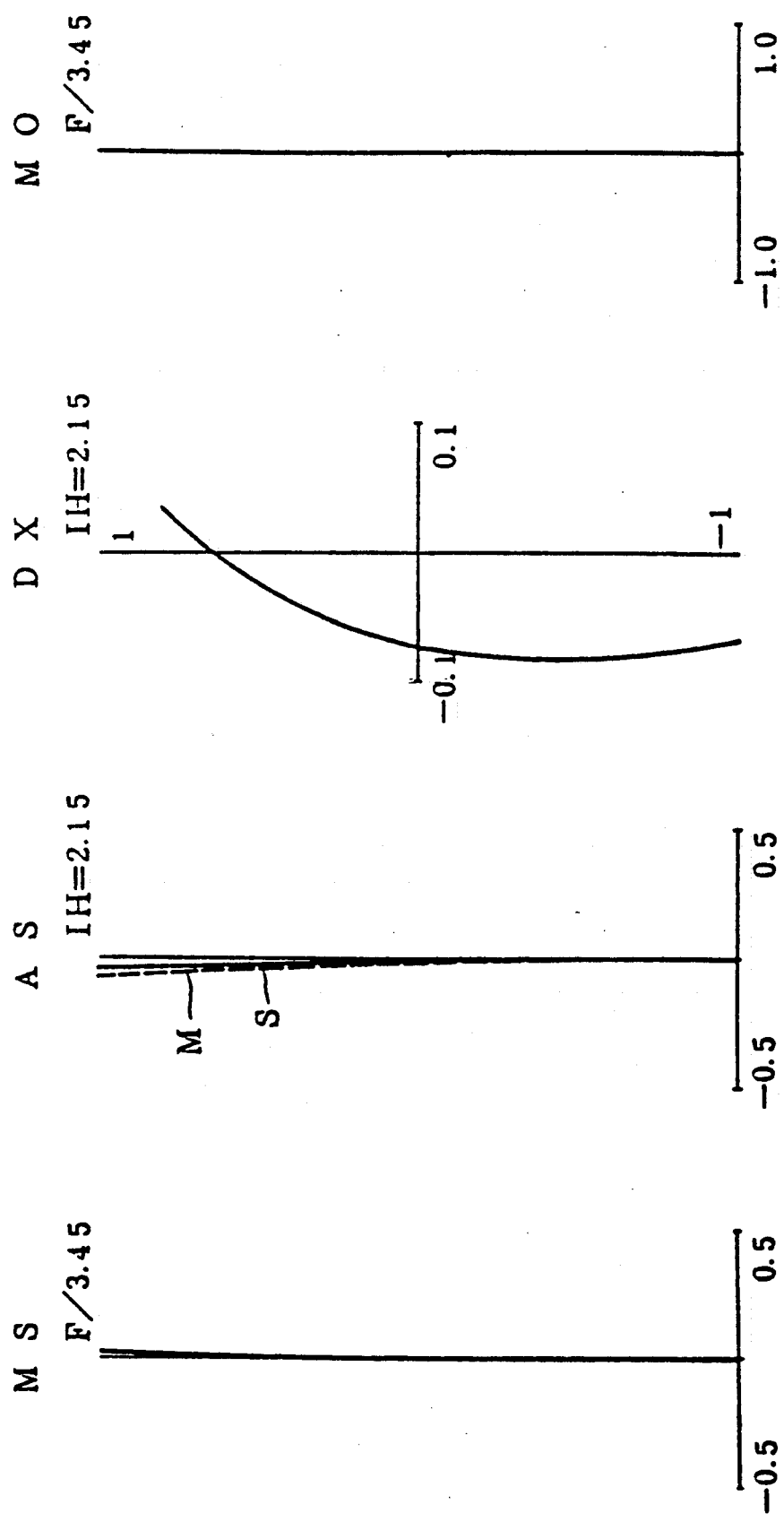
FIG. 23 (WIDE)

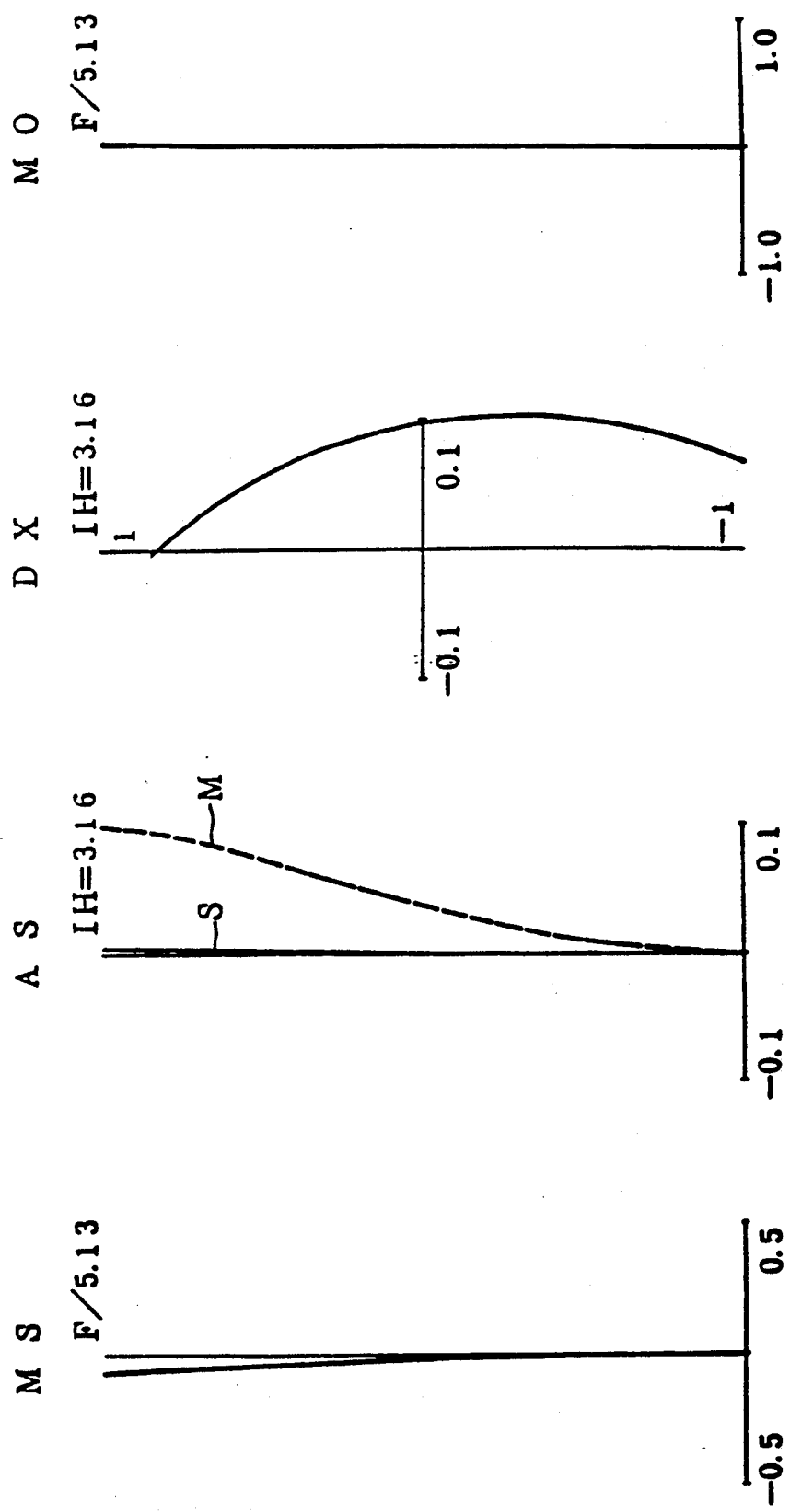
FIG.24 (TELE)

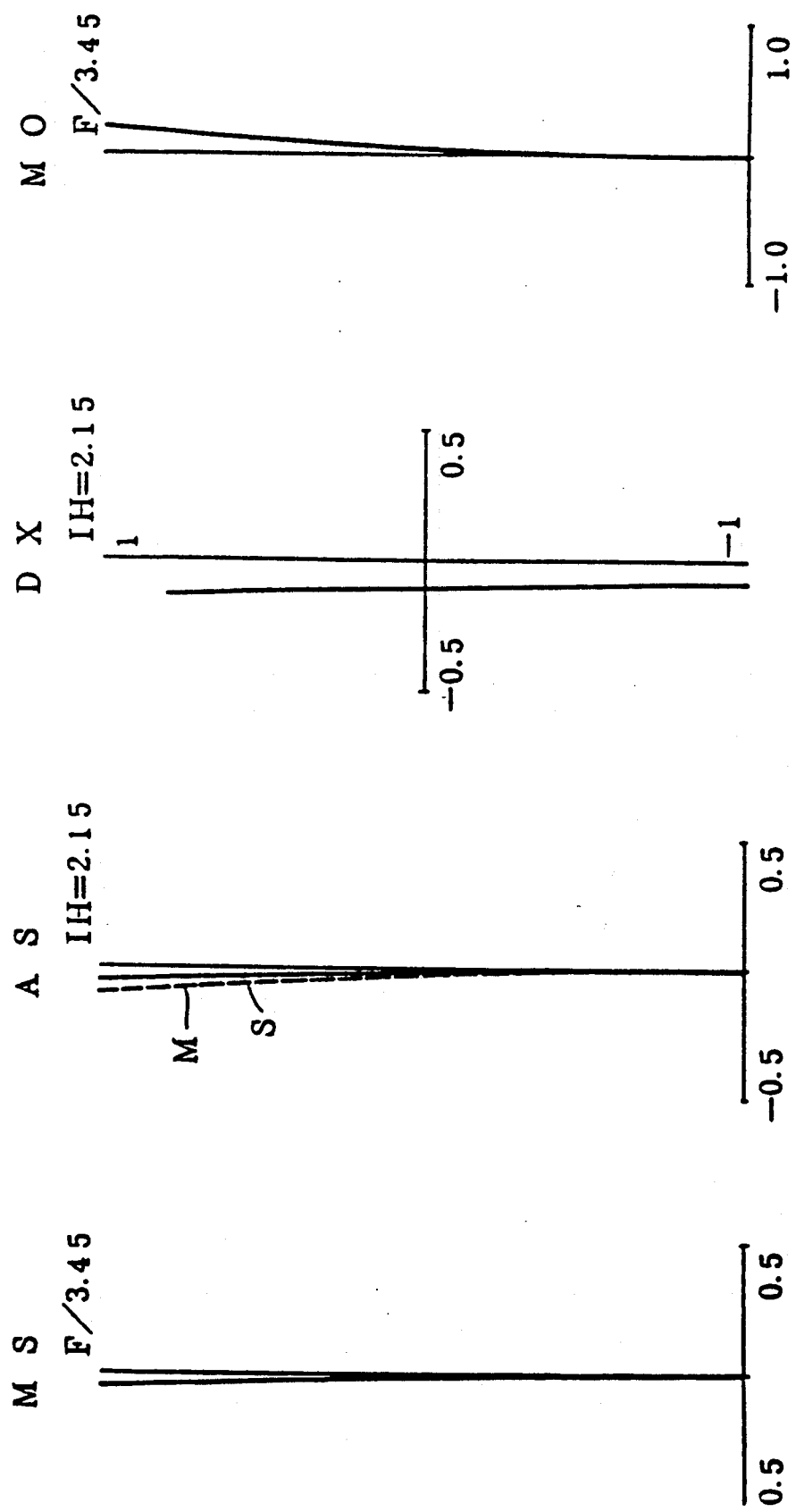
FIG. 25 (WIDE)

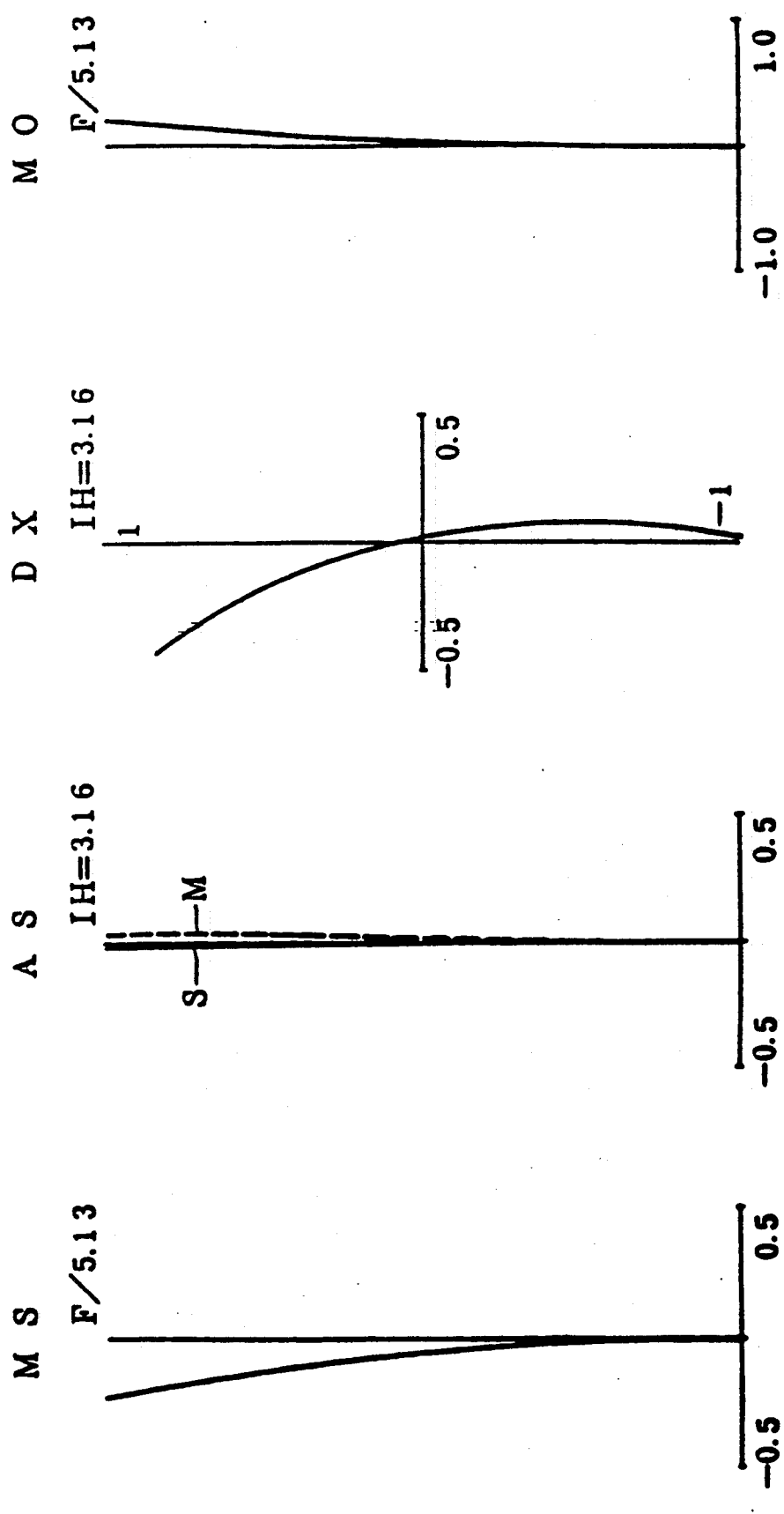
FIG.26 (TELE)

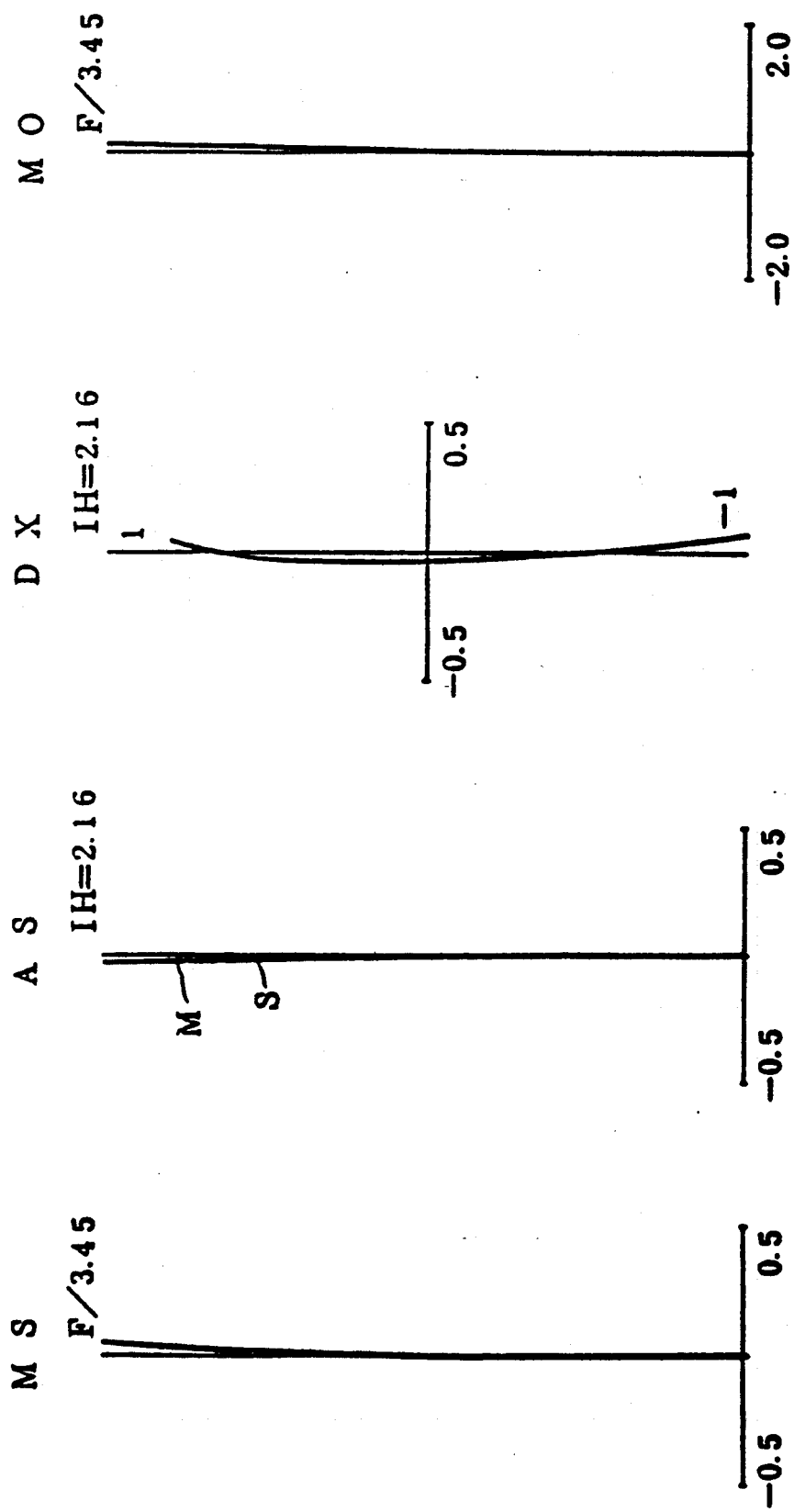
FIG.28 (WIDE)

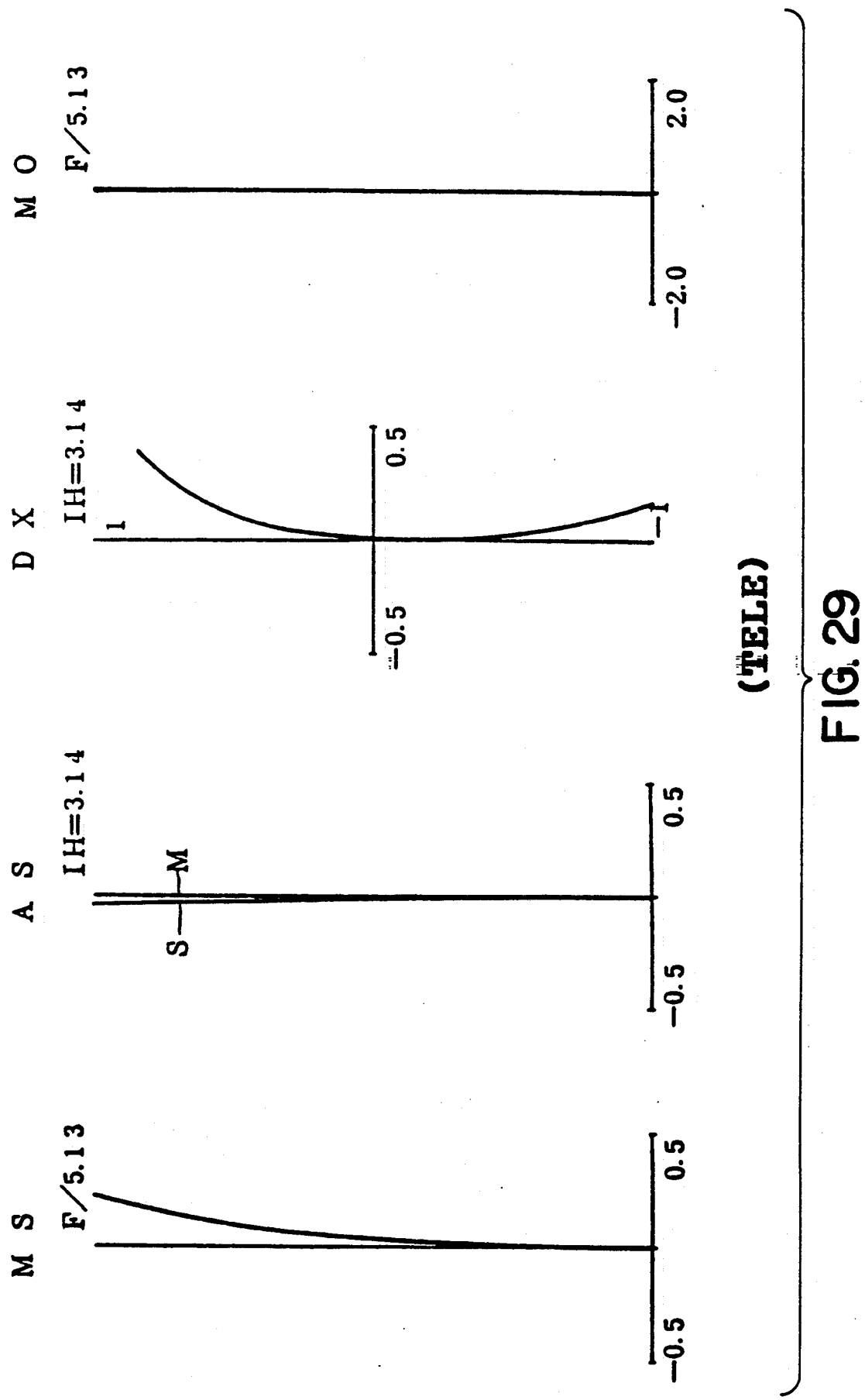
FIG. 29 (TELE)

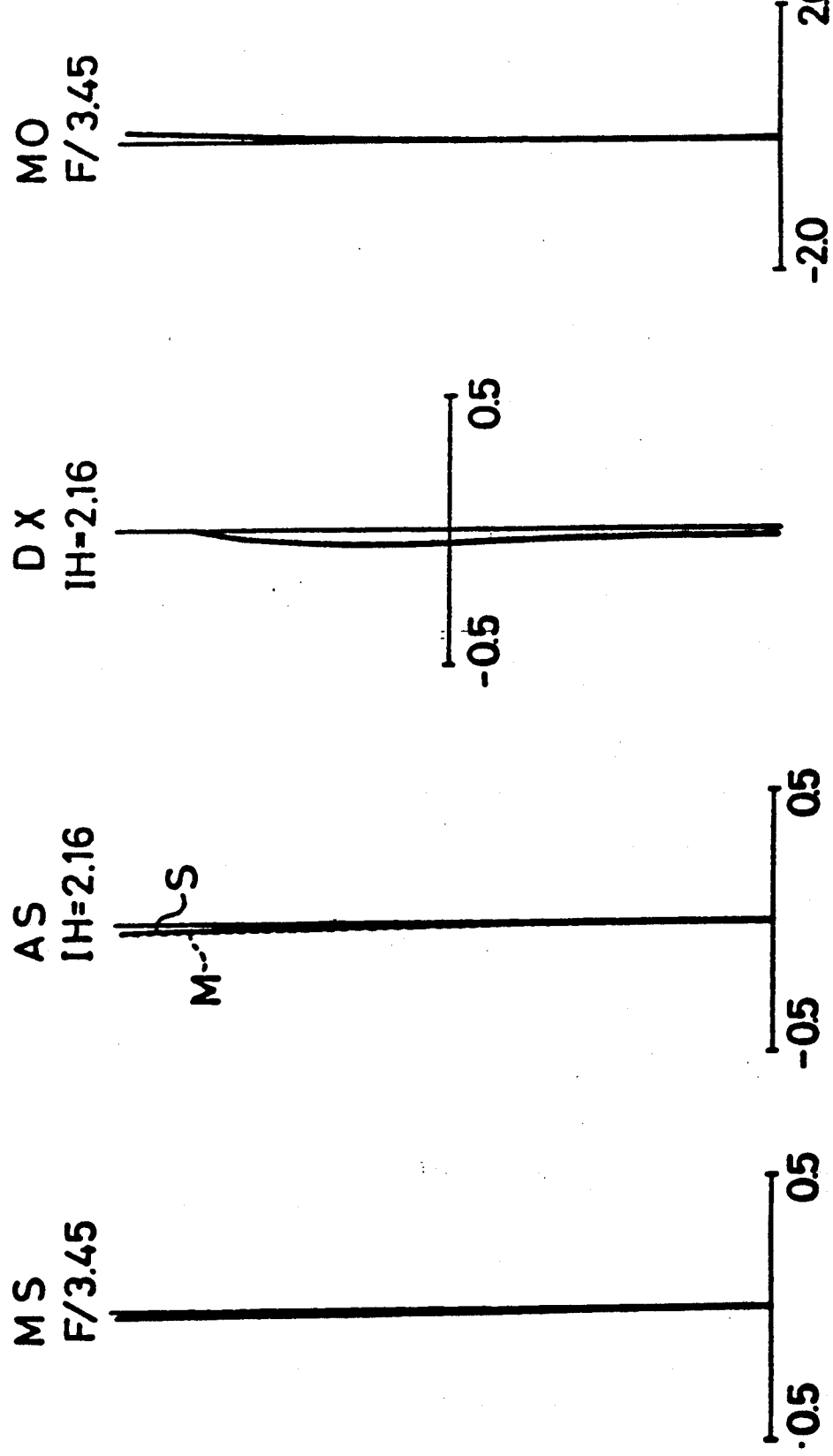
FIG.30 (WIDE)

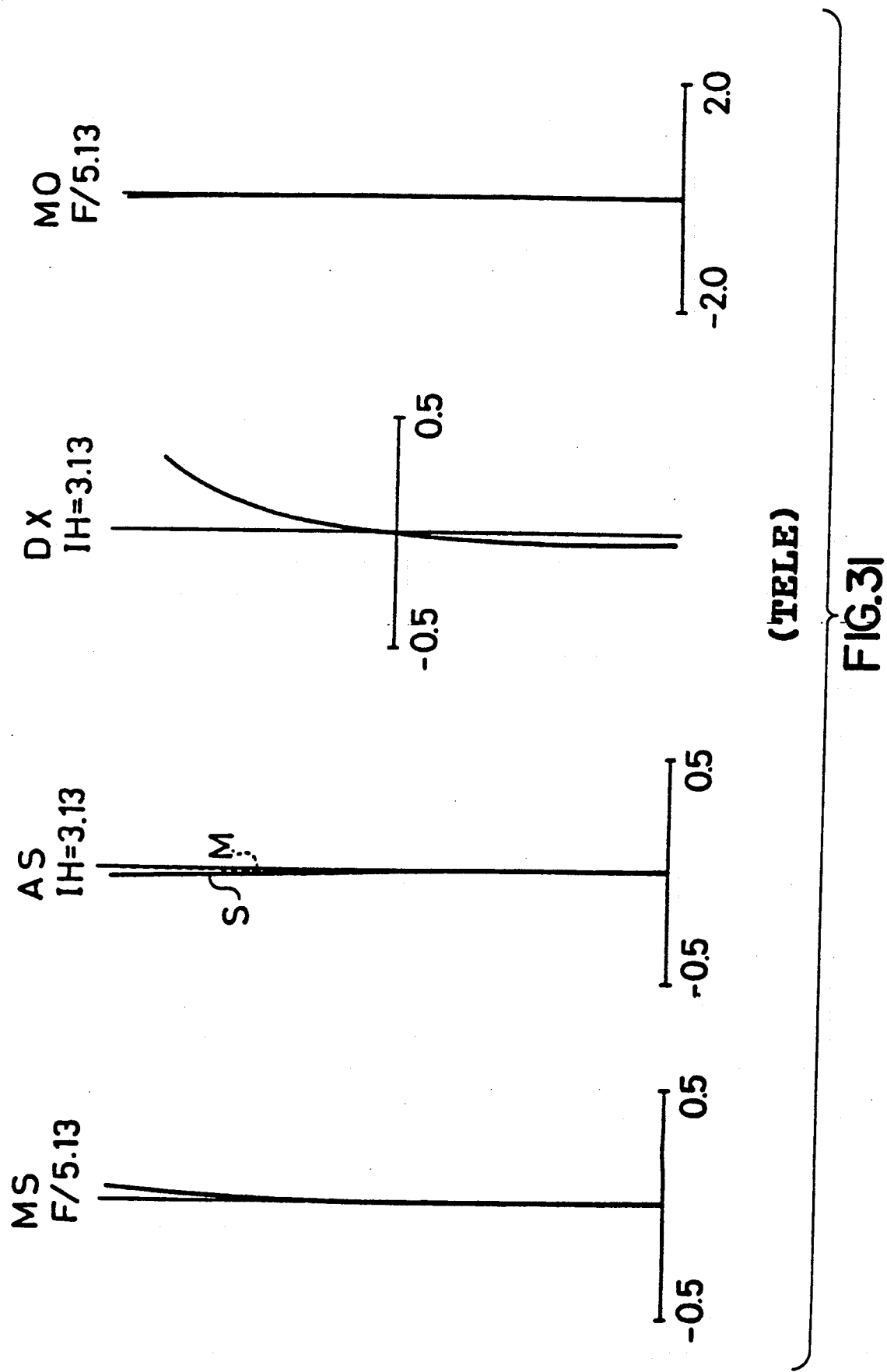
FIG.31 (TELE)

VARIFOCAL IMAGING OPTICAL SYSTEM HAVING MOIRE ELIMINATING FUNCTION

BACKGROUND OF THE INVENTION

1. Field of the Invention

This invention relates to an imaging optical system having moire eliminating function and more particularly to an imaging optical system suitable for use with a television camera, an electronic still camera, a video endoscope and the like.

2. Description of Related Art

Such optical apparatus as television cameras, electronic still cameras, video endoscopes and the like use image sensors such as solid-state image pickup devices, image pickup tubes and the like to obtain color images. In these optical apparatus, spurious signals called moire or aliasing are produced owing to the beats caused between the sampling frequency determined by the pitches of the arrangement of pixels of the solid-state image pickup device or the arrangement of color elements of a color encoding filter, such as a color striped filter, a color mosaic filter and the like, arranged on the light entering side of the solid-state image pickup device or image pickup tube, on the one hand, and the spatial frequency of an image formed on the light receiving surface of these image pickup means, on the other hand. These spurious signals are a dominant cause for a deterioration in the quality of images. Conventionally, in order to eliminate such spurious signals, optical low-pass filters formed by doublerefracting plates such as quartz plates have been arranged in the imaging optical system for forming an object image on the light receiving surface of the image pickup means (see, e.g., U.S. Pat. No. 4,807,981).

The conventional optical low-pass filter is arranged between the image pickup device and the imaging lens. Therefore, when a zoom lens is used as the imaging lens and the object to be imaged has a spatial frequency spectrum which has a large frequency component at a certain spatial frequency, the elimination of the spurious signals is insufficient or impossible except for a specific magnification, so that a substantial deterioration in the quality of images is caused. Such a phenomenon occurs evidently when a television camera is mounted on the eyepiece portion of a fiberscope. This example will be described in detail.

FIG. 1 shows schematically the eyepiece portion of a fiberscope on which a television camera is mounted. On the eyepiece portion of an endoscope 3 including an image guide fiber bundle 1 and an eyepiece 2 is mounted a television camera having an imaging lens 4, an optical low-pass filter 5 formed by double-refracting plates, and a CCD image pickup device 6. An object image formed on the light emerging end surface of the image guide fiber bundle 1 is imaged again on the light receiving surface of the CCD image pickup device 6 through the eyepiece 2, the imaging lens 4 and the optical low-pass filter 5 to pick up the image. As is well known, the image guide fiber bundle is formed by a large number of optical fibers closely bound together. FIG. 2 shows an enlargement of its light emerging end surface; only the core portions 8 of the regularly arranged fibers appear light. Thus, the image formed on the light emerging end surface is considered as the light pattern of these core portions 8 modulated by the brightness of the object. The spatial frequency spectrum of this object image has a large high frequency component centering around a fundamental frequency determined by the pattern of the core portions. The interference of this high frequency component with the sampling frequency of the CCD image pickup device 6 causes the spurious signals. If the imaging lens 4 is a zoom lens, the fundamental frequency varies with zooming so that the elimination of the spurious signals is insufficient.

FIG. 3 (A) and (B) illustrates this. In FIG. 3, the imaging lens comprises four lens units: a front lens 9, a variator lens 10 for varying the image magnification, a compensator lens 11 for compensating the displacement of the image position owing to the variation of magnification, and a relay lens 12. The imaging lens can have any magnification between a magnification $\beta_{LOW}$ (FIG. 3 (A)) and a magnification $\beta_{HIGH}$ (FIG. 3(B)) by moving the variator lens 10 and the compensator lens 11 along the optical axis. When the light and dark pattern 13 formed by the core portions 8 of the image guide fiber bundle and having a repetition pitch P is imaged by this imaging lens, the image on the light receiving surface has an arbitrary size between the smallest repetition pitch $P \times \beta_{LOW}$ (FIG. 3(A)) and the largest repetition pitch $P \times \beta_{HIGH}$ (FIG. 3(B)) and the above-mentioned fundamental frequency also varies between $1/(P \times \beta_{LOW})$ and $1/(P \times \beta_{HIGH})$.

The optical low-pass filter is to reduce the resolution on the higher frequency side than a predetermined spatial frequency to prevent the interference of the spatial frequency component of an object image and the sampling frequency of an image pickup device. As shown in FIG. 4, let MTF (modulation transfer function) and spatial frequency be plotted along the vertical and horizontal axes, respectively, to illustrate the frequency response of the optical low-pass filter. As shown by the solid line in FIG. 4, if the optical low-pass filter is designed in such a manner that MTF is zero at the fundamental frequency $1/(P \times \beta_{LOW})$, that is, has a trap point at the frequency $1/(P \times \beta_{LOW})$ at the time of low magnification imaging, a sufficient elimination of the spurious signals can be effected at the time of low magnification imaging. However, since MTF has a large value at the fundamental frequency $1/(P \times \beta_{HIGH})$ at the time of high magnification imaging, resolution is not reduced sufficiently so that the spurious signals cannot be eliminated. On the other hand, if the optical low-pass filter is designed in such a manner that MTF is zero at the frequency $1/(P \times \mu_{HIGH})$, that is, has a trap point at the frequency $1/(P \times \mu_{HIGH})$ so that the spurious signals can be eliminated at the time of high magnification imaging, resolution is excessively reduced at the time of low magnification imaging to deteriorate the quality of images because MTF is zero at the frequency $1/(P \times \mu_{HIGH})$ whereas it is preferable that MTF have a large value at a frequency under $1/(P \times \mu_{LOW})$.

Thus, an imaging optical system with an optical low-pass filter arranged between a zoom lens and its image plane poses various problems when an object having a large spectral component at a specific spatial frequency is imaged.

Furthermore, apart from the foregoing, if a plurality of fiberscopes are selectively attached to a single television camera to pick up an object image transmitted through their image guide fiber bundles, the spatial frequency spectrum of the object image may vary because each fiberscope may have its own thickness of fibers of the image guide fiber bundle or its own magnification of the eyepiece. In such cases, whether the imaging lens is a zoom lens or not, an optical low-pass filter arranged between the lens and an image pickup device can eliminate the spurious signals for one fiberscope, but may be useless for other fiberscopes so that substantial spurious signals may be produced.

SUMMARY OF THE INVENTION

An object of the present invention is to provide an imaging optical system having a lens system with variable magnification of its imaging lens in which a good effect of eliminating spurious signals can be obtained irrespective of its magnification.

Another object of the invention is to provide an imaging optical system having a lens system with variable magnification of its imaging lens in which a good effect of eliminating spurious signals can be obtained by varying the magnitude of spherical aberration caused by the imaging lens in accordance with the variation of its magnification.

A further object of the invention is to provide an imaging optical system having a lens system with variable magnification of its imaging lens in which the variation of spatial frequency response corresponding to the variation of the magnification of the imaging lens is reduced.

An imaging optical system according to the present invention comprises an imaging lens system for forming an image of an object on a given image plane in which the imaging lens can have different image magnifications without changing the positional relationship between the object and the image plane, that is, without changing their conjugate distance. Such a lens system may be a lens system with continuously variable magnification such as a zoom lens, or a lens system with discretely variable magnification such as a lens of the two-focal distance changeover type.

The imaging lens system with variable magnification according to the present invention comprises a varifocal lens portion for varying the image magnification and a front lens portion arranged on the light entering side of the varifocal lens portion and satisfies the condition:

$$|\phi_{3T}| - |\phi_{3W}| \geq 0.8|(Z-1)SA31| \quad (1)$$

where $\phi_{3T}$ is the sum of the third-order coefficients of spherical aberration of the respective lens surfaces of the imaging lens system in the state of its maximum magnification, $\phi_{3W}$ is the sum of the third-order coefficients of spherical aberration of the respective lens surfaces of the imaging lens system in the state of its minimum magnification, Z is the ratio of the maximum value to the minimum value of the magnification of the imaging lens system, and SA31 is the third-order coefficient of spherical aberration of the front lens portion.

An imaging optical system having an imaging lens system as described above has an excellent property that its spurious signal eliminating effect remains unchanged when its image magnification is varied, because the magnitude of spherical aberration caused by the imaging lens system varies with its magnification so that the variation of the spatial frequency response of the imaging lens corresponding to the variation of its image magnification is smaller than that of a usual varifocal lens.

Now, the present invention will be described in more detail.

In general, it is known that the resolution of a lens system is influenced by spherical aberration and that the MTF of the lens system generally decreases as spherical aberration becomes large. The basic concept of the present invention is to use this phenomenon and vary the amount of spherical aberration in accordance with the variation of the magnification of an imaging lens system to provide an imaging optical system with proper imaging characteristics.

First, aberration coefficients as a measure for evaluating the magnitude of spherical aberration will be defined. The aberration coefficients used in the following description are determined by the following formulae (2) and (3). The height of a paraxial ray, $H_0$, *at the first surface of the lens system is given as* $H_0 = OB \times NA/n_0$ where OB is the object distance, NA is the numerical aperture of the axial marginal ray entering the lens system, $n_0$ is the refractive index of the medium on the object side of the first surface of the lens system. When this ray is paraxially traced, the following two equations hold. Let the Z axis be taken along the optical axis, the Y axis in the meridional plane, and the X axis in the sagital plane. For the meridional rays ($\overline{X}=0$), $$\Delta Y = (SA3)H^3 + (CMA3)YH^2 + [3(AST3) + (PTZ3)]Y^2H + \quad (2)$$
$$(DIS3)Y^3 + (SA5)H^5 + (CMA5)YH^4 + (TOBSA)Y^2H^3 +$$
$$(ELCMA)Y^3H^2 + [5(AST5) + (PTZ5)]Y^4H +$$
$$(DIS5)Y^5 + (SA7)H^7$$

For the sagital rays ($\overline{Y}=0$), $$\Delta X = (SA3)H^3 + [(AST3) + (PTZ3)]Z^2H + (SA5)H^5 + \quad (3)$$
$$(SOBSA)Z^2H^3 + [(AST5) + (PTZ5)]Z^4H + (SA7)H^7$$

In the above equation (2), $\Delta Y$ represents the discrepancy between the paraxial image point (image point without aberration) and the real image point for the meridional rays, $\overline{Y}$ is the height (incident position) of the paraxial chief ray at the image plane normalized by the maximum image height, and $\overline{H}$ is the height (incident position) of the marginal ray at the pupil plane of the lens system normalized by the radius of the pupil at the pupil plane. $\Delta X$ indicates the discrepancy between the paraxial image point (image point without aberration) and the real image point for the sagital rays. In these equations, SA3, SA5 and SA7 are the coefficients of spherical aberration of the third, fifth and seventh order, respectively; CMA3 and CMA5 are the coefficients of tangential coma of the third and fifth order, respectively; AST3 and AST5 are the coefficients of astigmatism of the third and fifth order, respectively; PTZ3 and PTZ5 are Petzval's sums of the third and fifth order, respectively; DIS3 and DIS5 are distortion of the third and fifth order, respectively; TOBSA is the coefficient of oblique tangential spherical aberration of the fifth order; ELCMA is the coefficient of eliptical coma of the fifth order; and SOBSA is the coefficient of oblique sagital spherical aberration. Of these, spherical aberration is used in the present invention, thus it is represented as lateral aberration and newly designated as $\epsilon$. Then, $$\epsilon = (SA3)H^3 + (SA5)H^5 + (SA7)H \quad (4)$$

Of the terms of this formula, the third-order term usually contributes to spherical aberration greatly. Therefore, description is made first as to the properties which an imaging lens system should have with respect to spherical aberration of the third order.

FIG. 5 is a power layout of a varifocal lens system comprising a lens unit $G_1$ having a positive refractive power, a lens unit $G_2$ having a negative refractive power, and a lens unit $G_3$ having a positive refractive power in which a low magnification state (wide position) (A) and a high magnification state (tele position) (B) can be changed over by moving the lens unit $G_2$ back and forth along the optical axis. Assuming that a light pencil parallel to the optical axis and having a constant thickness is incident on the lens system, the properties of the lens system will be considered. In the following equations, SA31, SA32 and SA33 are the third-order coefficients of the lens units $G_1$, $G_2$ and $G_3$ at the wide position, respectively; $h_{VW}$ and $h_{MW}$ are the heights of the marginal ray at the lens units $G_2$ and $G_3$ at the wide position, respectively; $\beta_{VM}$ is the paraxial magnification of the lens unit $G_2$ at the wide position; $h_{VT}$ and $h_{MT}$ are the heights of the marginal ray at the lens units $G_2$ and $G_3$ at the tele position; $\beta VT$ is the paraxial magnification of the lens unit $G_2$ at the tele position; $f_V$ and $f_M$ are the focal lengths of the lens units $G_2$ and $G_3$, respectively; and Z is the ratio of the magnification of the entire system at the tele positions to that at the wide position. The sums $\phi_{3W}$ and $\phi_{3T}$ of the third-order coefficients of the lens units $G_1$, $G_2$ and $G_3$ at the wide and tele positions, respectively, are given by the following equations:

$$\phi_{3W} = SA31 + SA32 + SA33 \quad (5)$$

$$\phi_{3T} = Z \cdot SA31 + Z\left[\frac{h_{VT}}{h_{VW}}\right]^3 SA32 + Z\left[\frac{h_{MT}}{h_{MW}}\right]^3 SA33 \quad (6)$$

As is apparent from FIG. 5, when the magnification becomes high, the ray height at the lens units $G_2$ and $G_3$ becomes low and the rate of the coefficient of spherical aberration SA31 of the lens unit $G_1$ in the sum of the third-order coefficients of spherical aberration increases accordingly. From FIG. 5, the following relations can be obtained:

$$\begin{cases} h_{VT} = f_V\theta\left[\frac{1}{\beta_{VT}} + 1\right] \\ h_{VW} = f_V\theta\left[\frac{1}{\beta_{VW}} + 1\right] \end{cases} \quad (7)$$

$$\begin{cases} h_{MT} = f_M\frac{\theta}{\beta_{VT}} \\ h_{MW} = f_M\frac{\theta}{\beta_{VW}} \end{cases} \quad (8)$$

Using these, equation (6) can be transformed as follows:

$$\phi_{3T} = Z \cdot SA31 + Z\left\{\frac{1}{z}\left[\frac{\beta_{VT}+1}{\beta_{VW}+1}\right]\right\}^3 SA32 + Z\left[\frac{1}{Z}\right]^3 SA33 \quad (9)$$

In order to make the total length of the lens system compact, it is preferable that the magnification of the lens unit $G_2$ vary in the following range including a magnification of 1:

$$\frac{1}{\sqrt{Z}} < |\beta_V| < \sqrt{Z} \quad (10)$$

In this case, equation (9) can be more simplified and expressed as follows:

$$\phi_{3T} = Z \cdot SA31 + \frac{1}{\sqrt{Z}} SA32 + \frac{1}{Z^2} SA33 \quad (11)$$

If $SA32 = SA33 = 0$, that is, the third-order coefficients of the lens units $G_2$ and $G_3$ are zero, then, $$\begin{cases} \phi_{3W} = SA31 \\ \phi_{3T} = Z \cdot SA31 \end{cases} \quad (12)$$

In accordance with equation (4), such a lens system has a characteristic that the spherical aberration $\epsilon$ represented by lateral aberration becomes large (the size of the circle of confusion becomes large) in proportion to the increase of the image magnification. In terms of MTF, this means as follows: Let and $\beta_{LOW}$ and $\beta_{HIGH}$ be the magnifications of the entire lens system at the wide and tele positions, respectively. When the MTF curve at the wide position has its cutoff frequency at a spatial frequency $1/(P \times \beta_{LOW})$ as indicated by the solid line in FIG. 6, the cutoff frequency at the tele position of the lens system satisfying the relation of equation (12) is $1/(P \times \beta_{HIGH}) = 1/(Z P \times \beta_{LOW})$ and its MTF curve is indicated by the broken line in FIG. 6. This means that the size of the pattern constituting the limit of resolution of the lens system becomes Z times as the magnification varies from low to high. Since Z is the ratio of magnification variation, this is equivalent to the fact that the size of the pattern constituting the limit of resolution is kept constant on the object surface. Therefore, the imaging optical system including a varifocal lens system satisfying equation (12), in other words, the following relation, $$\phi_{3T} = \phi_{3W} = (Z-1)SA31 \quad (13)$$

removes the drawback which the conventional imaging optical system has, that is, the problem that the spurious signal eliminating effect changes with the variation of magnification. In equation (13), the signs of the aberration coefficients are also considered. However, since the size of the circle of confusion does not relate to the signs of the aberration coefficients, it is important to consider the magnitudes, that is, the absolute values of the aberration coefficients. Therefore, in order to determine whether equation (13) is satisfied, it is necessary to see it in the form of absolute values, that is, $$||\phi_{3T}| - |\phi_{3W}|| = |(Z-1)SA31|$$

Furthermore, if the amount of spherical aberration is small at the tele position, the spurious signals are evident. Thus, if equation (13) does not hold, it is necessary that the following relation does not hold:

$$||\phi_{3T}| - |\phi_{3W}|| < |(Z-1)SA31|$$

Therefore, combining these, it is necessary that the following relation hold:

$$|\phi_{3T}| - |\phi_{3W}| \geq |(Z-1)SA31|$$

In the above description, the lens system has been explained as having the two position: the wide and tele positions. However, when the lens group $G_1$ or $G_2$ is moved along the optical axis to correct the image position, it becomes a so-called zoom lens. It is obvious that the same discussion also holds in this case.

Next, the same study will be made for a so-called two-unit zoom lens. FIG. 7 is a power layout of a zoom lens comprising a lens unit $G_1$ of a negative refractive power and a lens unit $G_2$ of a positive refractive power; (A) shows the wide position (low magnification state) and (B) shows the tele position (high magnification state). In this lens system, the lens unit $G_2$ mainly contributes to zooming and the lens unit $G_1$ functions as a so-called compensator. Also here assuming that the height of the marginal ray is constant, the following equation holds:

$$\frac{h_{VT}}{h_{VW}} = \frac{1}{Z} \frac{(1-\beta_{2T})}{(1-\beta_{2W})} \tag{14}$$

where $h_{VW}$ and $h_{VT}$ are the ray heights at the wide and tele positions, respectively; Z is the zooming ratio; and $\beta_{2W}$ and $\beta_{2T}$ are the magnifications at the wide and tele 2T positions. In many of such zoom lenses with their front unit negative, since it is necessary to lengthen the back focus and maintain a certain space between the lens units $G_1$ and $G_2$ at the tele position, the magnification of the lens unit $G_2$ is as follows:

$$\beta_{2W} \approx -1, \beta_{2T} \approx -\frac{1}{Z} \tag{15}$$

However, if the magnification of the lens unit $G_2$ is changed to the usual one such that $$\beta_{2W} = -\frac{1}{\sqrt{Z}}, \beta_{2T} = -\sqrt{Z} \tag{16}$$

and the magnification of the lens unit $G_2$ varies in this range, that is, $$\frac{1}{\sqrt{Z}} < |\beta_2| < \sqrt{Z}$$

then, $$\frac{h_{VT}}{h_{VW}} = \frac{1}{\sqrt{Z}} \tag{17}$$

If this relation holds, the sums of the coefficients of spherical aberration are expressed in the same way as equations (5) and (11), that is, $$\begin{cases} \phi_{3W} = SA31 + SA32 \\ \phi_{3T} = Z \cdot SA31 + \frac{1}{\sqrt{Z}} SA32 \end{cases} \tag{18}$$

Therefore, if $SA32 = 0$, that is, the third-order spherical aberration of the lens unit $G_2$ is zero, a zoom lens in which the size of the circle of confusion varies in proportion to the variation of magnification can be obtained as in the case of the three-unit zoom lens. Although SA32 and SA33 are not zero in actual lens systems, it is also possible in this case to make the size of the circle of confusion vary with the variation of magnification.

FIGS. 8 and 9 show the shift of the third-order coefficients of spherical aberration from the wide to tele position of the above-mentioned three-unit and two-unit zoom lenses, respectively, the vertical axes representing the magnitude of the third-order coefficients of spherical aberration. In usual cases, the third-order coefficient of spherical aberration is made zero between the wide and tele positions as shown by the broken lines in the figures to render the absolute value of the aberration coefficient in the zooming range as small as possible. In the present invention, however, as is apparent from FIG. 8, the absolute value of the third-order coefficient of spherical aberration SA31 of the lens unit $G_1$ at the wide position is increased and balanced with the third-order coefficients of spherical aberration of the other lens units to make SA31 predominant at the wide position. Then, SA31 will be enlarged with zooming whereas SA32 and SA33 will be reduced with zooming as can be seen from equation (11) and (18). Thus, the absolute value of the entire system will increase with the shift from the wide to tele position.

In the three-unit varifocal lens shown here, SA31 is larger than SA32 and SA33 at the wide position and the absolute value of SA31 is larger than the absolute value of SA32 +SA33. Further, the spherical aberration of the entire system has the same sign between the wide and tele positions and its magnitude gradually increases.

There is the same tendency in the two-unit zoom lens. As can be seen from FIG. 9, SA31 is larger than SA32 at the wide position, and the spherical aberration of the entire system has the same sign between the wide and tele positions and its magnitude gradually increases.

For the purpose of practical use, it is sufficient that the following equation holds:

$$|\phi_{3T}| - |\phi_{3W}| \geq 0.8|(Z-1)SA31| \tag{19}$$

this is because as shown in FIG. 6, when a large amount of spherical aberration is given rise to, the MTF of the lens system varies almost linearly, that is, relatively gently as the spatial frequency becomes high, so that a sufficient effect of spurious signal elimination can be obtained in most cases even if the cutoff frequency is a little different from the optimal value.

Although the foregoing is the discussion about the third-order coefficients of spherical aberration, the same applies to the spherical aberration of a high order.

For example, the fifth-order coefficients of spherical aberration will be considered. For the three-unit lens system shown in FIG. 5, the following equations corresponding to equations (5) and (6) for the third-order coefficients of spherical aberration hold:

$$\phi_{5W} = SA51 + SA52 + SA53 \tag{20}$$
$$\phi_{5T} = Z \cdot SA51 + Z(h_{VT}/h_{VW})^5 SA52 + Z(h_{MT}/h_{MW})^5 SA53 \tag{21}$$

where $\phi_{5W}$ and $\phi_{5T}$ are the sums of the fifth-order coefficients of spherical aberration of the entire system at the wide and tele positions, respectively; and SA51, SA52 and SA53 are the fifth-order coefficients of spherical aberration of the lens units $G_1$, $G_2$ and $G_3$, respectively.

As in the case of the third-order coefficients of spherical aberration, the following equation can be derived from the above equations:

$$\phi_{5T} = Z \cdot SA51 + [1/(Z\sqrt{Z})]SA52 + (1/Z^4)SA53 \quad (22)$$

Further, for the two-unit lens system shown in FIG. 7, the following equations corresponding to equations (18) hold:

$$\phi_{5W} = SA51 + SA52 \quad (23)$$

$$\phi_{5T} = Z \cdot SA51 + [1/(Z\sqrt{Z})]SA52 \quad (24)$$

Therefore, just like in the case of the third-order coefficients of aberration, it is preferable to satisfy $$||\phi_{5T}| - |\phi_{5W}|| \geq |(Z - b\ 1)SA51| \quad (25)$$

Especially, for the purpose of practical use, it is sufficient to satisfy.

$$||\phi_{5T}| - |\phi_{5W}|| \geq 0.8|(Z-1)SA51| \quad (26)$$

When the aberrations of the third and fifth order are considered together, the amount of spherical aberration caused by the entire system can be optimal if either of the following equations holds:

$$|\phi_{3T}| + |\phi_{5T}| - |\phi_{3W}| - |\phi_{5W}|$$
$$\geq (Z - b\ 1)(|SA31| + |SA51|) \quad (27)$$

or $$|\phi_{3T}| + |\phi_{5T}| - |\phi_{3W}| - |\phi_{5W}|$$
$$\geq 0.8(Z - b\ 1)(|SA31| + |SA51|) \quad (28)$$

BRIEF DESCRIPTION OF THE DRAWINGS

FIGS. 14 and 15 are graphs showing the aberration characteristics of the second embodiment.

FIGS. 17 and 18 are graphs showing the aberration characteristics of the third embodiment.

FIG. 19 (A) and 19 (B) are sectional view of a lens system according to a fourth embodiment of the present invention.

FIGS. 23 to 26 are graphs showing the aberration characteristics of the fifth embodiment.

FIGS. 28 to 31 are graphs showing the aberration characteristics of the sixth embodiment.

DESCRIPTION OF THE PREFERRED EMBODIMENTS

Figure 1:
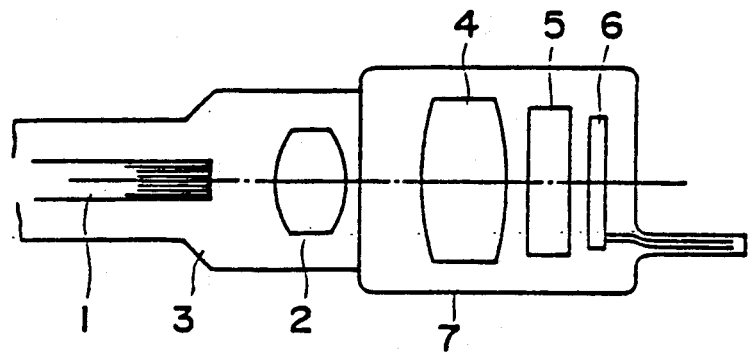
FIG. 1 is a schematic view of a conventional endoscopic image pickup apparatus with a television camera mounted on the eyepiece portion of a fiberscope.
Figure 2:
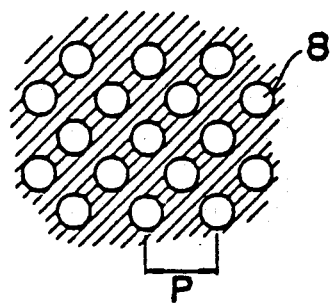
FIG. 2 is a partial enlarged view of the light emerging end surface of an image guide fiber bundle of the fiberscope.
Figure 3A:
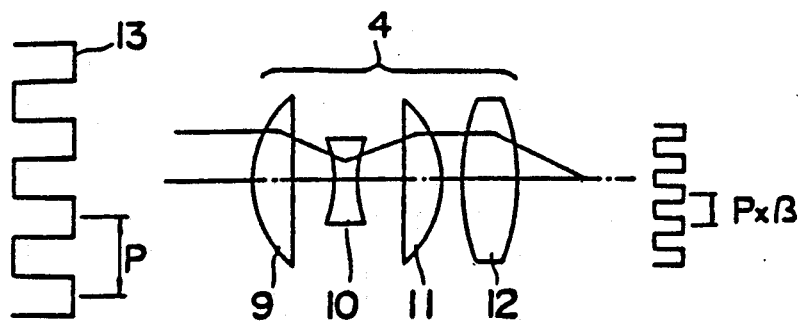
FIG. 3 (A) and 3 (B) are diagrams showing how the light emerging end surface of the image guide fiber bundle is imaged by a varifocal lens.
Figure 3B:
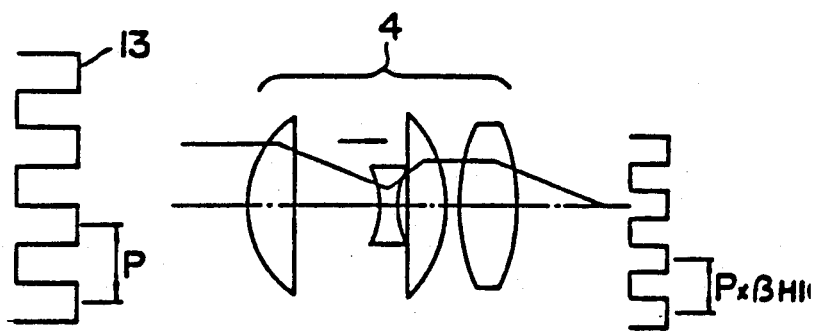
Figure 4:
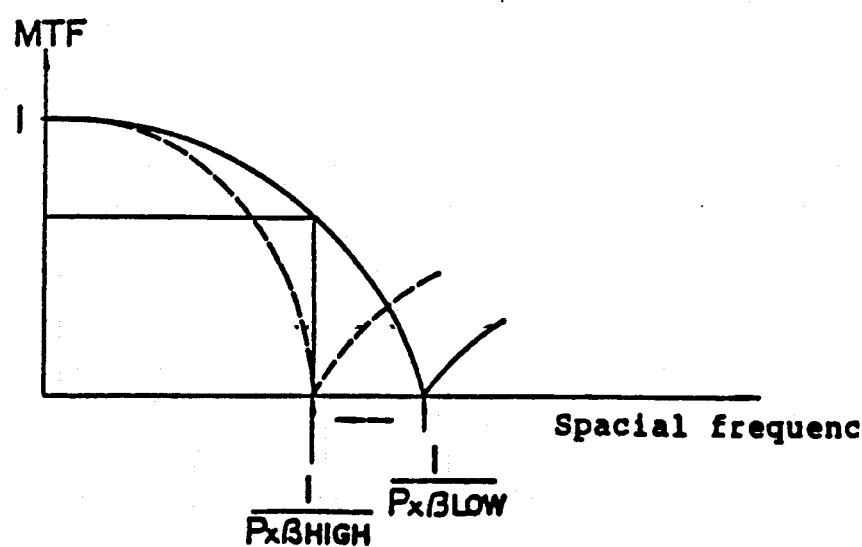
FIG. 4 is a graph showing the spatial frequency response of a conventional image pickup apparatus.
Figure 5:
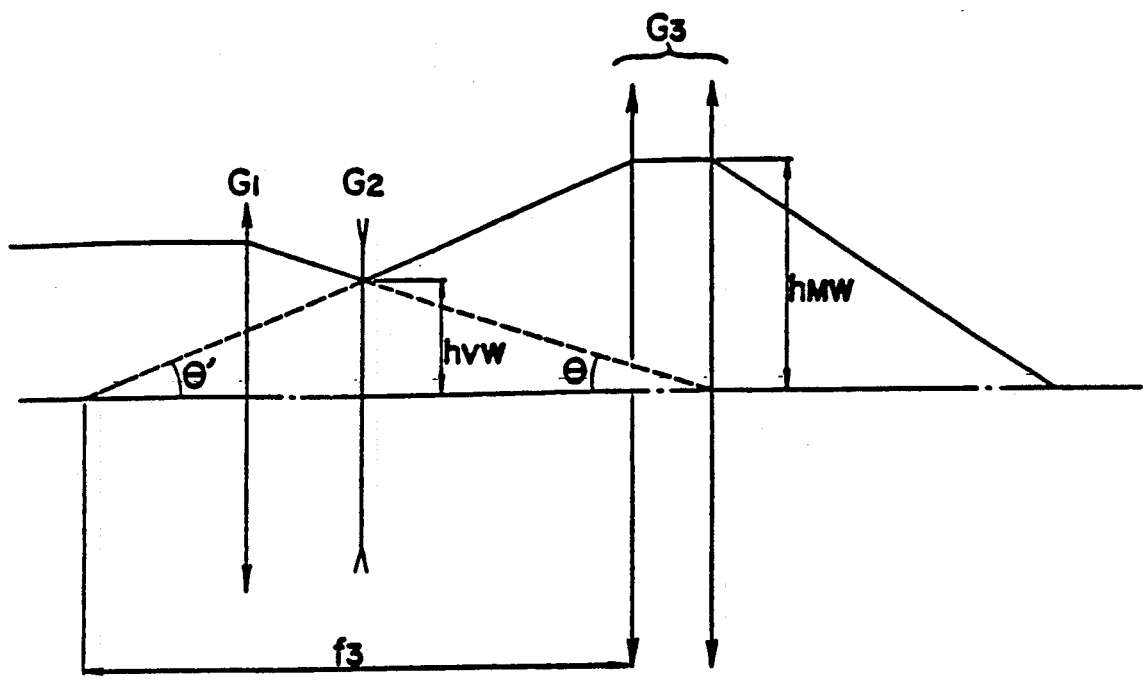
FIG. 5 (A) and 5 (B) are diagrams showing the power layout of a three-unit varifocal lens system according to the present invention.
Figure 5:
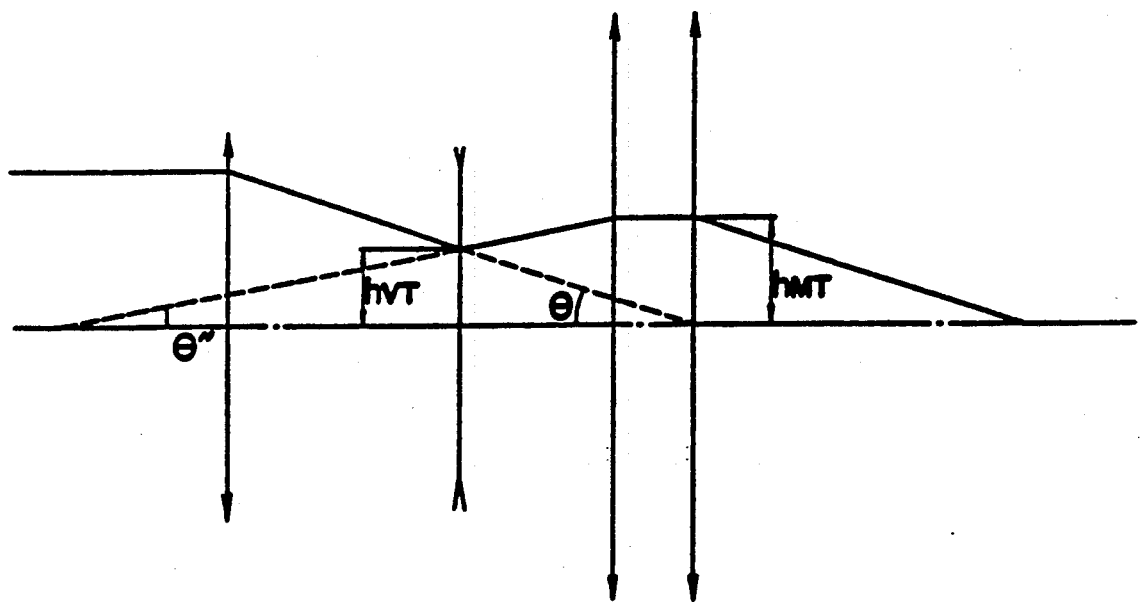
Figure 6:
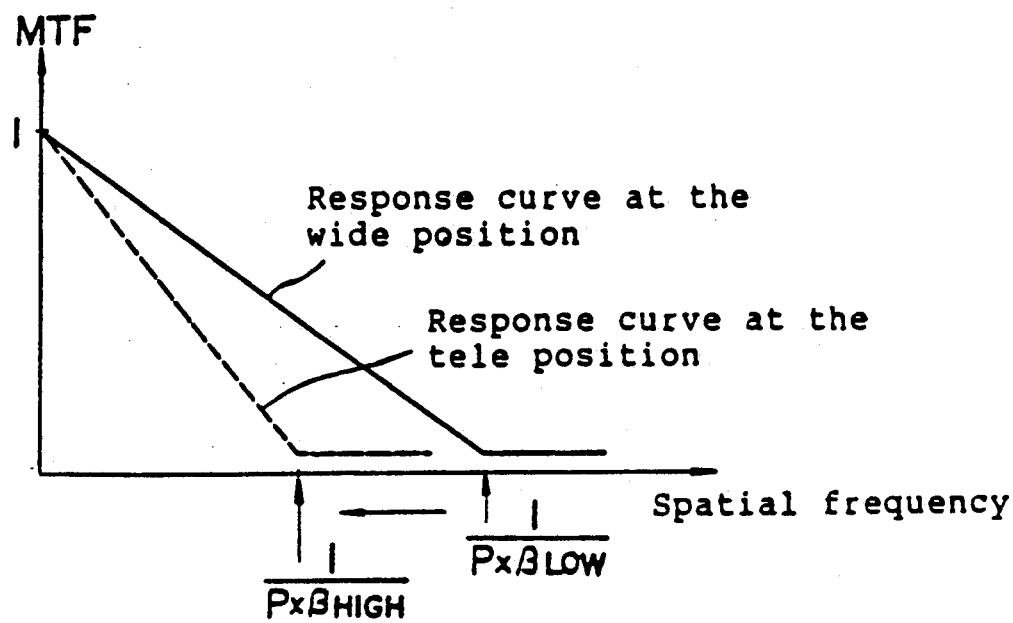
FIG. 6 is a graph showing the spatial frequency response of the lens system of FIG. 5.
Figure 8:
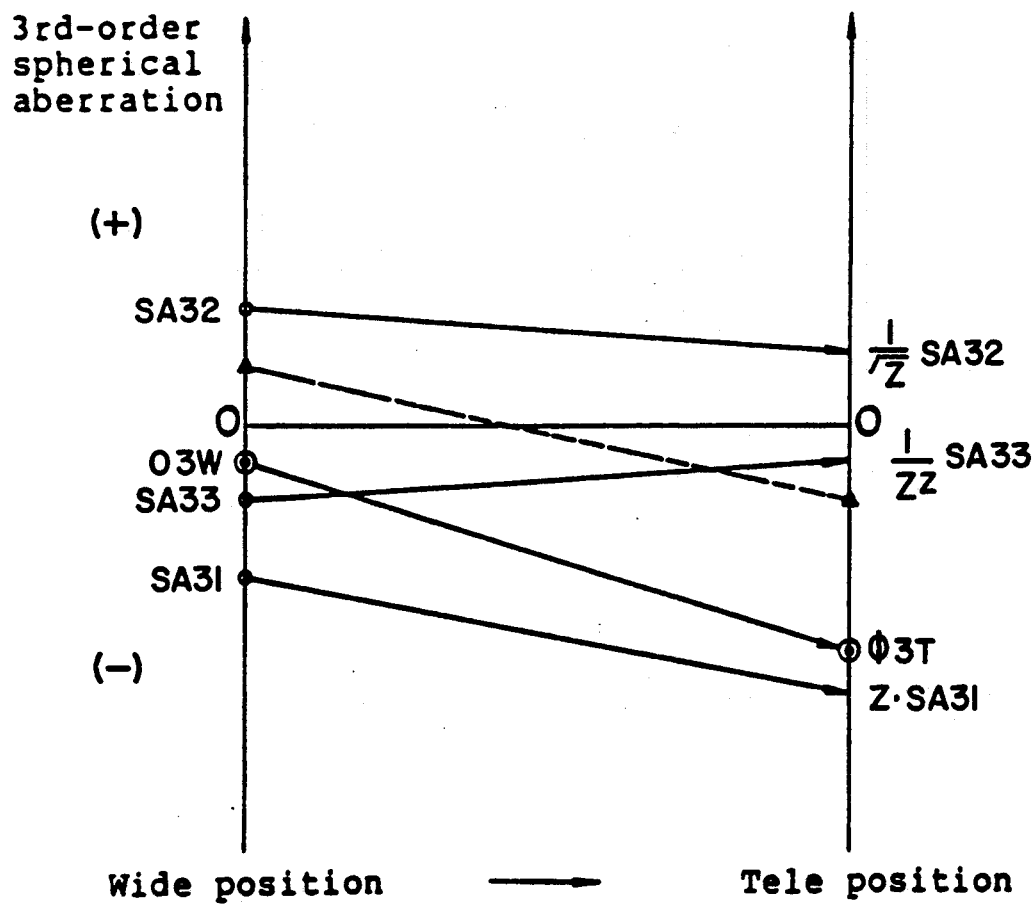
FIG. 8 is a diagram showing the third-order coefficients of spherical aberration of the lens system of FIG. 5.
Figure 7:
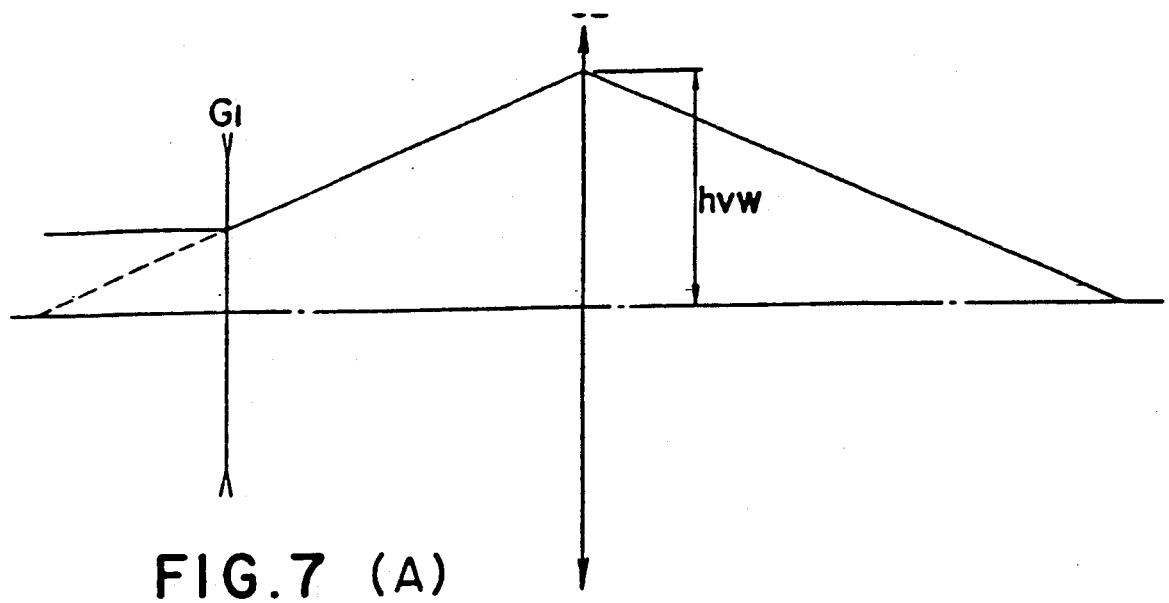
FIG. 7 (A) and 7 (B) are diagram showing the power layout of a two-unit varifocal lens system according to the present invention.
Figure 7:
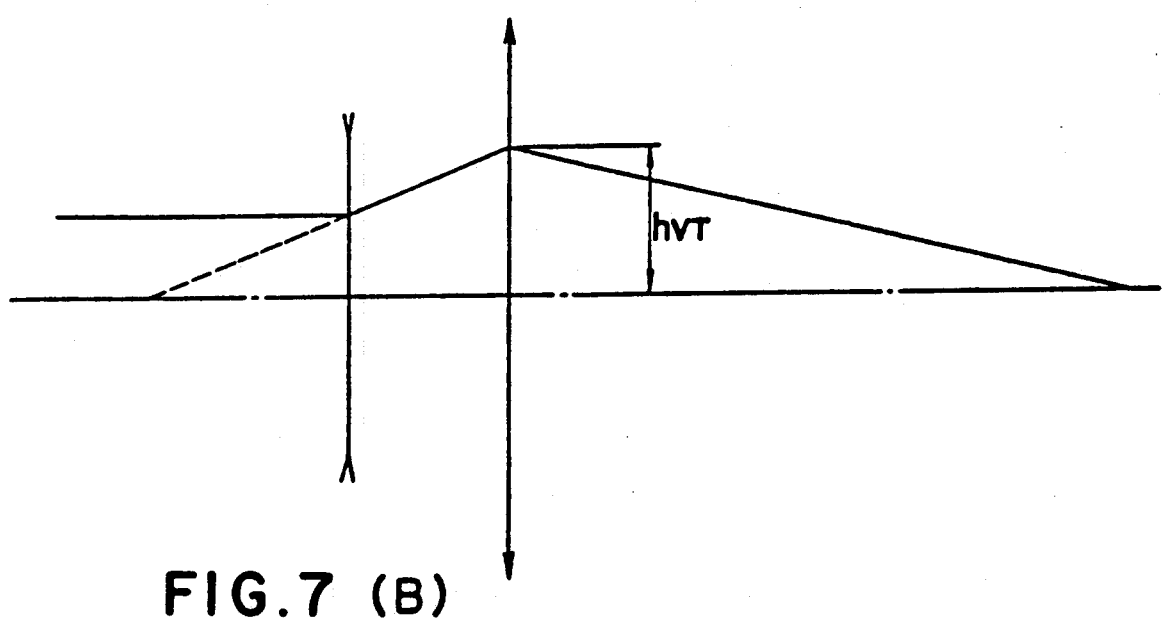
Figure 9:
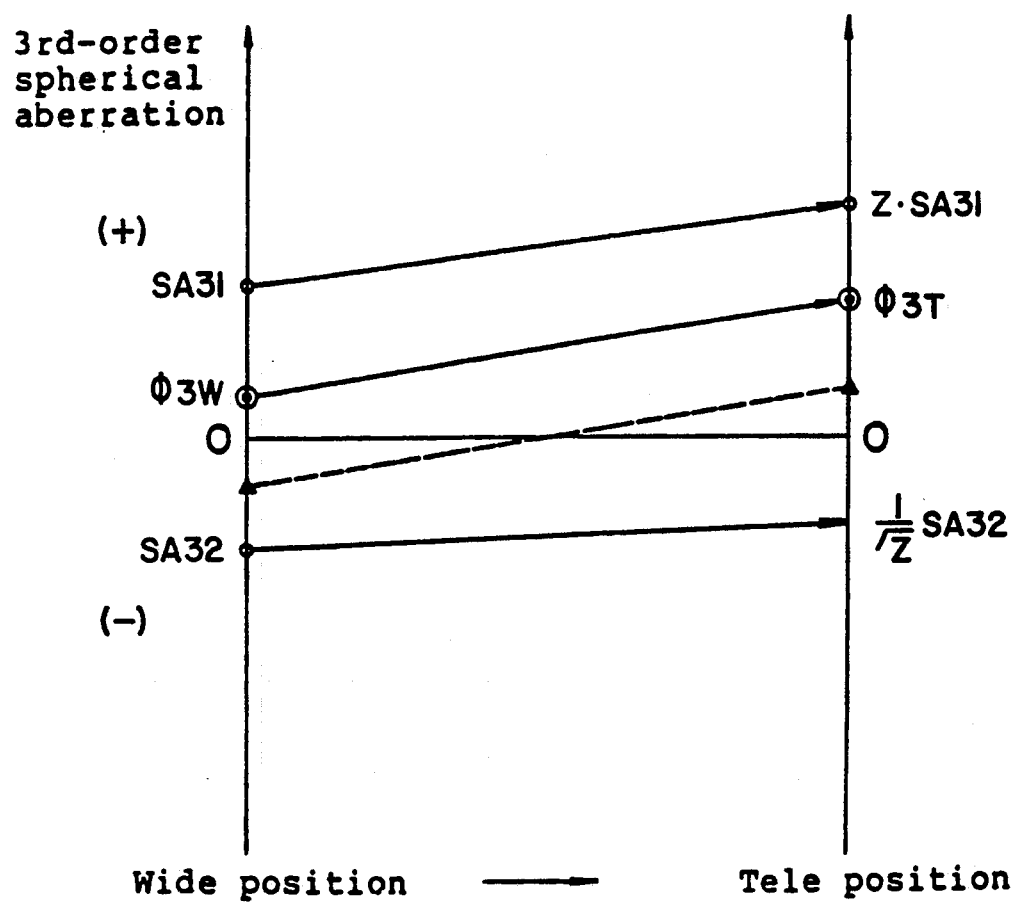
FIG. 9 is a diagram showing the third-order coefficients of spherical aberration of the lens system of FIG. 7.
Figure 10:
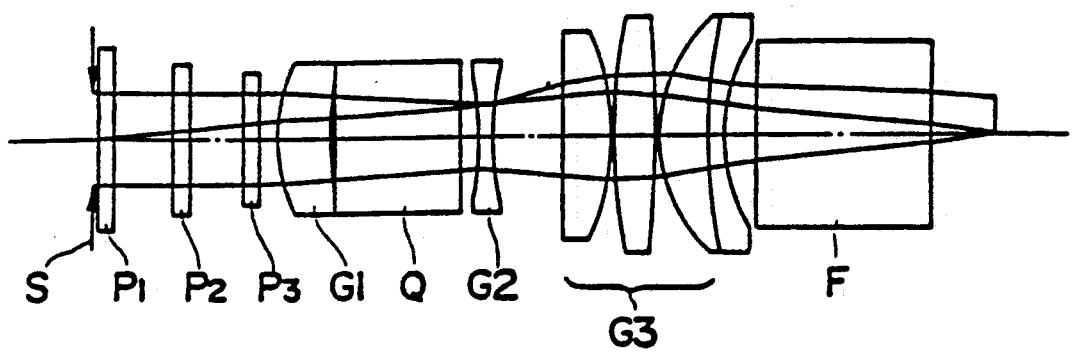
FIG. 10 (A) and 10 (B) are sectional view of a lens system according to a first embodiment of the present invention.
Figure 10:
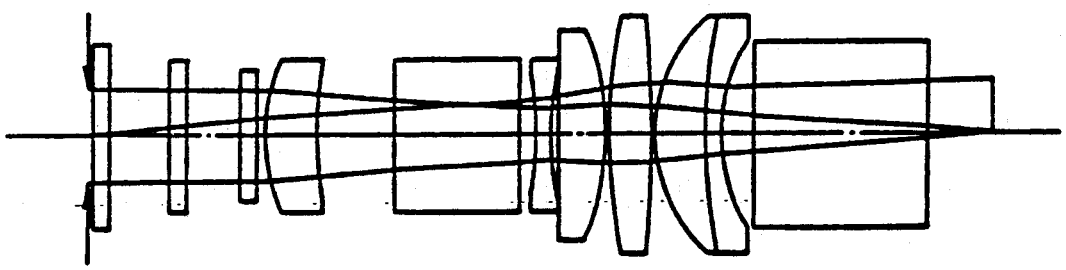

FIG. 10 is a sectional view showing the lens arrangement of a first embodiment of the present invention, (A) and (B) representing the wide and tele positions, respectively. There are arranged, from the object to image side, an aperture stop S, cover glasses $P_1$, $P_2$ and $P_3$, a lens unit $G_1$ functioning as a compensator, an optical low-pass filter Q formed by quartz plates, a lens unit $G_2$ functioning as a variator, a lens unit G functioning as a relay lens, and various filters F. Since this optical system is of the so-called front stop type in which the stop is arranged at a position which is the nearest to the object, it satisfies the condition that the height of the marginal ray incident on the lens unit G does not vary at the wide and tele positions. SA31 is made large by reducing the refractive index of the lens unit $G_1$ and selecting the radius of curvature so as to cause the rays to be refracted strongly at the incident surface. The lens data are as follows.

$r_1$, $r_2$, ... are the radii of curvature of the respective lens surfaces; $d_1$, $d_2$, ... are the distances between the respective lens surfaces; $n_1$, $n_2$, ... are the refractive indices of the respective lenses; $\nu_1$, $\nu_2$, ... are Abbe's numbers of the respective lenses; f is the focal length of the entire system; F/ is the f-number; IH is the image height; and $f_B$ is the back focus.

| | | | |
|---|---|---|---|
| $r_1 = \infty$ (stop) | | | |
| | $d_1 = 0.3$ | | |
| $r_2 = \infty$ | | | |
| | $d_2 = 1.0$ | $n_1 = 1.51633$ | $\nu_1 = 64.15$ |
| $r_3 = \infty$ | | | |
| | $d_3 = 3.5$ | | |
| $r_4 = \infty$ | | | |
| | $d_4 = 1.0$ | $n_2 = 1.51633$ | $\nu_2 = 64.15$ |
| $r_5 = \infty$ | | | |
| | $d_5 = 3.2$ | | |
| $r_6 = \infty$ | | | |
| | $d_6 = 1.0$ | $n_3 = 1.79952$ | $\nu_3 = 42.24$ |

-continued

| | | | |
|---|---|---|---|
| $r_7 = \infty$ | | | |
| | $d_7 = Z_1$ (variable) | | |
| $r_8 = 10.7948$ | | | |
| | $d_8 = 3.07$ | $n_4 = 1.51633$ | $\nu_4 = 64.15$ |
| $r_9 = 24.0284$ | | | |
| | $d_9 = Z_2$ (variable) | | |
| $r_{10} = \infty$ | | | |
| | $d_{10} = 7.46$ | $n_5 = 1.54869$ | $\nu_5 = 45.55$ |
| $r_{11} = \infty$ | | | |
| | $d_{11} = 1.0$ | | |
| $r_{12} = -18.3118$ | | | |
| | $d_{12} = 0.8$ | $n_6 = 1.883$ | $\nu_6 = 40.78$ |
| $r_{13} = 17.2749$ | | | |
| | $d_{13} = Z_3$ (variable) | | |
| $r_{14} = \infty$ | | | |
| | $d_{14} = 2.827$ | $n_7 = 1.72916$ | $\nu_7 = 54.68$ |
| $r_{15} = -14.8762$ | | | |
| | $d_{15} = 0.2$ | | |
| $r_{16} = 37.9947$ | | | |
| | $d_{16} = 2.5$ | $n_8 = 1.72916$ | $\nu_8 = 54.68$ |
| $r_{17} = -72.0119$ | | | |
| | $d_{17} = 0.2$ | | |
| $r_{18} = 9.3403$ | | | |
| | $d_{18} = 2.9503$ | $n_9 = 1.72916$ | $\nu_9 = 54.68$ |
| $r_{19} = 34.9521$ | | | |
| | $d_{19} = 0.97$ | $n_{10} = 1.84666$ | $\nu_{10} = 23.78$ |
| $r_{20} = 10.7435$ | | | |
| | $d_{20} = 1.87$ | | |
| $r_{21} = \infty$ | | | |
| | $d_{21} = 10.5$ | $n_{11} = 1.54869$ | $\nu_{11} = 45.55$ |
| $r_{22} = \infty$ | | | |

| f | 18.623 | 28.78 |
|---|---|---|
| $Z_1$ | 1.1 | 0.507 |
| $Z_2$ | −0.348 | 4.633 |
| $Z_3$ | 4.192 | 0.5 |
| F/ | 3.45 | 5.12 |
| IH | 2.2 | 3.18 |
| $f_B$ | 3.8 | 3.8 |

Figure 11:
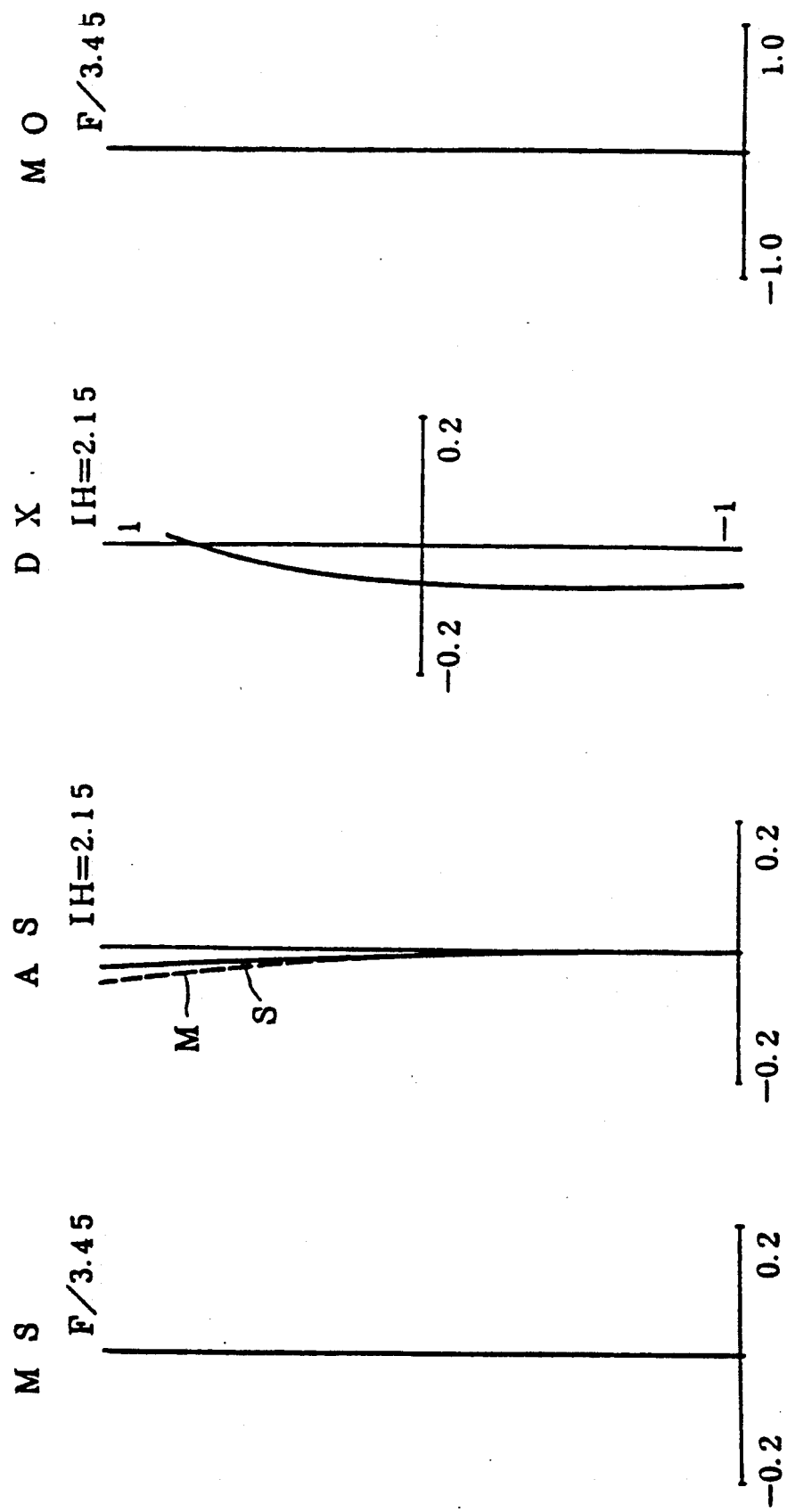
FIGS. 11 and 12 are graphs showing the aberration characteristics of the first embodiment.
Figure 12:
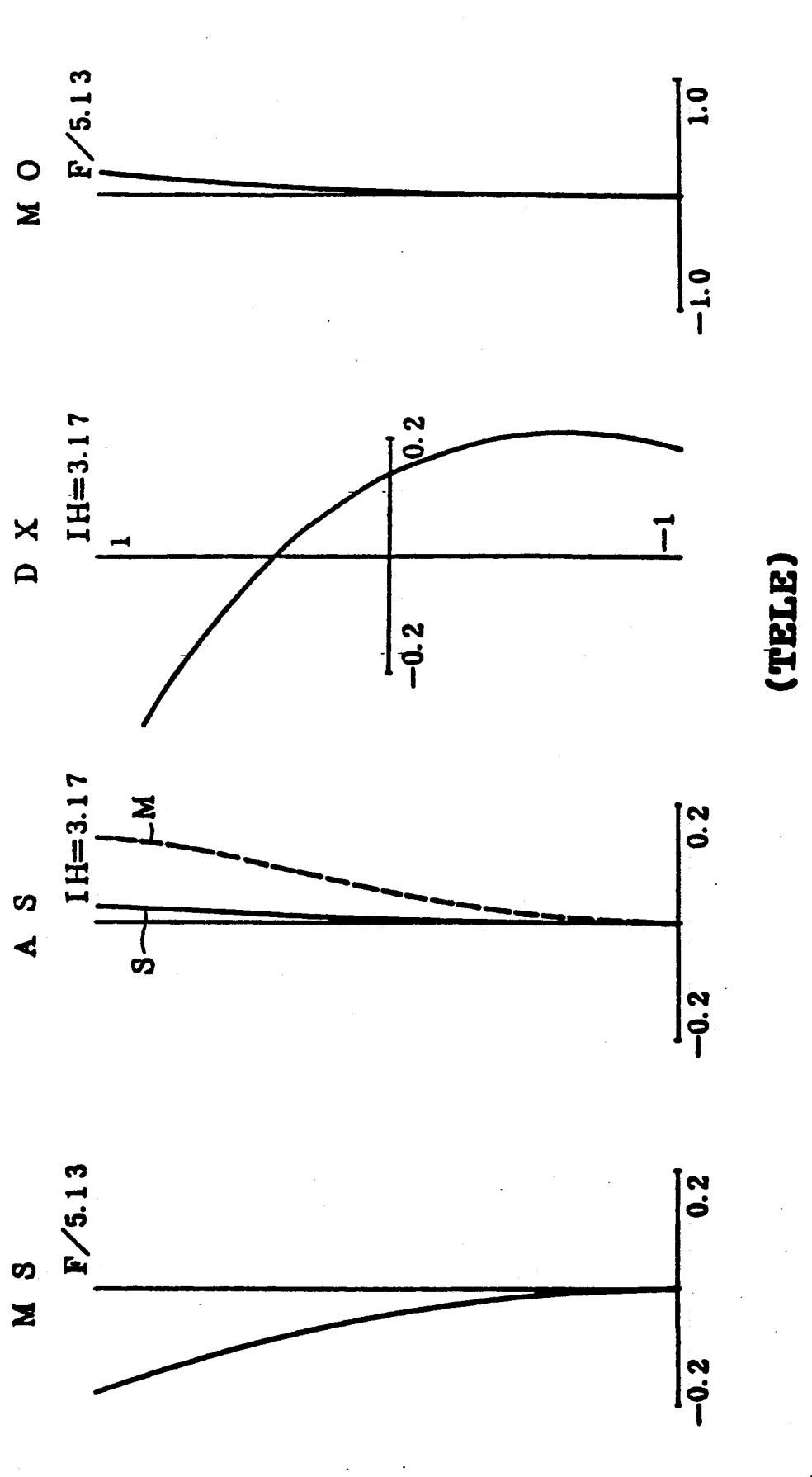

$Z = 1.485$
$\phi_{3W} = \times 10^{-5}$
$\phi_{3T} = -1687 \times 10^{-5}$
$SA31 = -2943 \times 10^{-5}$
$|\phi_{3T}| - |\phi_{3W}| = 1577 \times 10^{-5}$
$0.8|(Z-1)SA31| = 1142 = 10^{-5}$
$\phi_{5W} = 104 \times 10^{-5}$
$\phi_{5T} = -74 \times 10^{-5}$
$SA51 = -100 \times 10^{-5}$
$|\phi_{3T}| + |\phi_{5T}| - |\phi_{3W}| - |\phi_{5W}| = 1547 \times 10^{-5}$
$0.8(Z-1)(|SA31| + |SA51|) = 1181 \times 10^{-5}$ FIGS. 11 and 12 are graphs showing the aberration characteristics at the wide and tele positions, respectively. In the figures, MS is spherical aberration, AS is astigmatism, DX is coma, and MO is the offence of sine condition.

Figure 13:
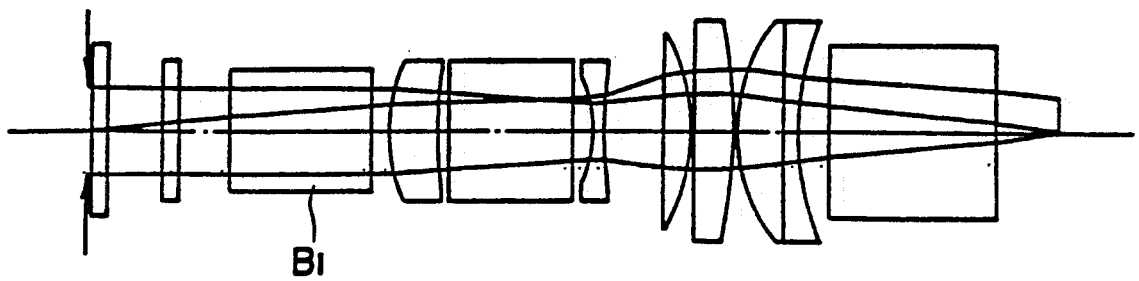
FIG. 13 (A) and 13 (B) are sectional view of a lens system according to a second embodiment of the present invention.
Figure 13:
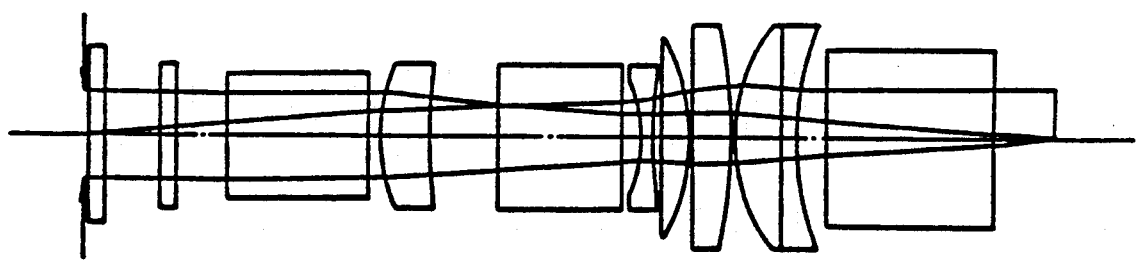

FIG. 13 is a sectional view showing the lens arrangement of a second embodiment of the present invention which is the same as the first embodiment except that a glass block $B_1$ is arranged instead of the cover glass $P_3$. In this embodiment, aspherical surfaces defined by the following equation are used for the light entering side surface of the lens unit $G_1$ and the image side surface of the cemented lens of the lens unit $G_3$:

$$X = \frac{CY^2}{1 + \sqrt{1 - pC^2Y^2}} + \sum_{i=1}^{\infty} A_{2i} Y^{2i} \quad (29)$$

where the X axis coincides with the optical axis; the Y axis is perpendicular to the X axis with the origin being at the intersection of the optical axis and the vertex of the surface; C is the curvature of the surface at the vertex thereof; p is the conic constant; and $A_{2i}$ is the aspherical coefficient of the 2i-th order.

To use the aspherical surface for the light entering side which is the nearest to the stop is suitable for causing a large amount of spherical aberration. In order to cause especially a large amount of spherical aberration of the third order, this aspherical surface has a shape such that the deviation from the reference spherical surface increases monotonically toward the image side. Further, when the aspherical surface is used, spherical aberration of a higher order, such as the fifth and seventh order, also becomes large.

Moreover, since astigmatism is caused by the aspherical surface of the lens unit $G_1$, it is corrected by the aspherical surface provided at the most image side surface of the lens unit $G_3$ in which the positional difference between the axial and off-axial light pencils is large. The lens data of this embodiment is as follows. (A) after the value of the radius of curvature indicates that this surface is aspheric.

| | | | |
|---|---|---|---|
| $r_1 = \infty$ (stop) | | | |
| | $d_1 = 0.3$ | | |
| $r_2 = \infty$ | | | |
| | $d_2 = 1.0$ | $n_1 = 1.51633$ | $\nu_1 = 64.15$ |
| $r_3 = \infty$ | | | |
| | $d_3 = 3.5$ | | |
| $r_4 = \infty$ | | | |
| | $d_4 = 1.0$ | $n_2 = 1.51633$ | $\nu_2 = 64.15$ |
| $r_5 = \infty$ | | | |
| | $d_5 = 3.2$ | | |
| $r_6 = \infty$ | | | |
| | $d_6 = 9.0$ | $n_3 = 1.79952$ | $\nu_3 = 42.24$ |
| $r_7 = \infty$ | | | |
| | $d_7 = Z_1$ (variable) | | |
| $r_8 = 11.6553$ (A) | | | |
| | $d_8 = 3.07$ | $n_4 = 1.51633$ | $\nu_4 = 64.15$ |
| $r_9 = 39.8394$ | | | |
| | $d_9 = Z_2$ (variable) | | |
| $r_{10} = \infty$ | | | |
| | $d_{10} = 7.7843$ | $n_5 = 1.54869$ | $\nu_5 = 45.55$ |
| $r_{11} = \infty$ | | | |
| | $d_{11} = 1.2$ | | |
| $r_{12} = -9.2241$ | | | |
| | $d_{12} = 0.8$ | $n_6 = 1.883$ | $\nu_6 = 40.78$ |
| $r_{13} = 40.0065$ | | | |
| | $d_{13} = Z_3$ (variable) | | |
| $r_{14} = \infty$ | | | |
| | $d_{14} = 1.7972$ | $n_7 = 1.72916$ | $\nu_7 = 54.68$ |
| $r_{15} = -12.4589$ | | | |
| | $d_{15} = 0.2$ | | |
| $r_{16} = 849.8133$ | | | |
| | $d_{16} = 2.5$ | $n_8 = 1.72916$ | $\nu_8 = 54.68$ |
| $r_{17} = -33.9956$ | | | |
| | $d_{17} = 0.2$ | | |
| $r_{18} = 11.3343$ | | | |
| | $d_{18} = 2.9503$ | $n_9 = 1.72916$ | $\nu_9 = 54.68$ |
| $r_{19} = \infty$ | | | |
| | $d_{19} = 0.97$ | $n_{10} = 1.84666$ | $\nu_{10} = 23.78$ |
| $r_{20} = 19.918$ (A) | | | |
| | $d_{20} = 1.87$ | | |
| $r_{21} = \infty$ | | | |
| | $d_{21} = 10.5$ | $n_{11} = 1.54869$ | $\nu_{11} = 45.55$ |
| $r_{22} = \infty$ | | | |

| (The 8th surface) | p = 1 | $A_4 = 0.33703 \times 10^{-4}$ |
| | | $A_6 = 0.5150 \times 10^{-6}$ |
| (The 20th surface) | p = 1 | $A_4 = 0.24884 \times 10^{-4}$ |
| | | $A_6 = 0.38686 \times 10^{-7}$ |

| f | 18.375 | 28.36 |
|---|---|---|
| $Z_1$ | 1.1 | 0.76 |
| $Z_2$ | 0.646 | 4.18 |
| $Z_3$ | 3.694 | 0.5 |
| F/ | 3.45 | 5.12 |
| IH | 2.65 | 3.18 |

-continued

| | | |
|---|---|---|
| $f_B$ | 3.983 | 3.983 |

FIGS. 14 and 15 are graphs showing the aberration
$Z = 1.485$
$\phi_{3W} = 19 \times 10^{-5}$
$\phi_{3T} = -2075 \times 10^{-5}$
$SA31 = -4704 \times 10^{-5}$
$|\phi_{3T}| - |\phi_{3W}| = 2056 \times 10^{-5}$
$0.8|(Z-1)SA31| = 1825 \times 10^{-5}$
$\phi_{5W} = -84 \times 10^{-5}$
$\phi_{5t} = -408 \times 10^{-5}$
$SA51 = -390 \times 10^{-5}$
$|\phi_{3T}| + |\phi_{5T}| - |\phi_{3W}| - |\phi_{5W}| = 2380 \times 10^{-5}$
$0.8(Z-1)(|SA31| + |SA51|) = 1976 \times 10^{-5}$ FIGS. 14 and 15 are graphs showing the aberration characteristics at the wide and tele positions, respectively. Owing to the aberration of the third order at the aspherical surface $r_8$, spherical aberration at the tele position increases monotonically with the increase of the ray height.

Figure 16A:
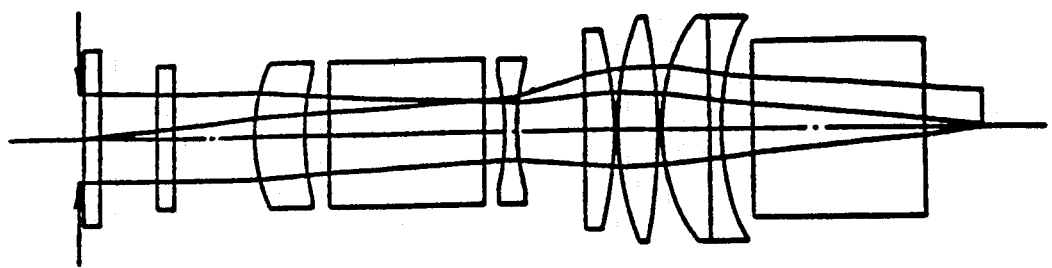
FIG. 16 (A) and 16 (B) are sectional view of a lens system according to a third embodiment of the present invention.
Figure 16B:
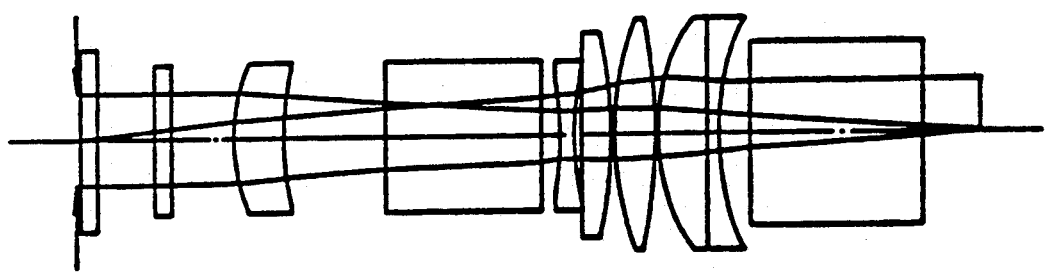

FIG. 16 is a sectional view of the lens arrangement of a third embodiment of the present invention. In this embodiment, a large amount of spherical aberration of the third and fifth order is caused by an aspherical surface provided in the lens unit $G_1$. The shape of this aspherical surface is such that the deviation from the reference spherical surface increases toward the image side and then decreases after the ray height exceeds a predetermined value. The lens data are as follows:

| | | | |
|---|---|---|---|
| $r_1 = \infty$ (stop) | | | |
| | $d_1 = 0.3$ | | |
| $r_2 = \infty$ | | | |
| | $d_2 = 1.0$ | $n_1 = 1.51633$ | $\nu_1 = 64.15$ |
| $r_3 = \infty$ | | | |
| | $d_3 = 3.5$ | | |
| $r_4 = \infty$ | | | |
| | $d_4 = 1.0$ | $n_2 = 1.51633$ | $\nu_2 = 64.15$ |
| $r_5 = \infty$ | | | |
| | $d_5 = Z_1$ (variable) | | |
| $r_6 = 10.7743$ (A) | | | |
| | $d_6 = 3.07$ | $n_3 = 1.51633$ | $\nu_3 = 64.15$ |
| $r_7 = 20.1979$ | | | |
| | $d_7 = Z_2$ (variable) | | |
| $r_8 = \infty$ | | | |
| | $d_8 = 9.4002$ | $n_4 = 1.54869$ | $\nu_4 = 45.55$ |
| $r_9 = \infty$ | | | |
| | $d_9 = 1.2$ | | |
| $r_{10} = -17.8926$ | | | |
| | $d_{10} = 0.8$ | $n_5 = 1.883$ | $\nu_5 = 40.78$ |
| $r_{11} = 18.493$ | | | |
| | $d_{11} = Z_3$ (variable) | | |
| $r_{12} = \infty$ | | | |
| | $d_{12} = 1.7972$ | $n_6 = 1.72916$ | $\nu_6 = 54.68$ |
| $r_{13} = -26.5428$ | | | |
| | $d_{13} = 0.2$ | | |
| $r_{14} = 19.3551$ | | | |
| | $d_{14} = 2.5$ | $n_7 = 1.72916$ | $\nu_7 = 54.68$ |
| $r_{15} = -36.2672$ | | | |
| | $d_{15} = 0.2$ | | |
| $r_{16} = 12.4338$ | | | |
| | $d_{16} = 2.9503$ | $n_8 = 1.72916$ | $\nu_8 = 54.68$ |
| $r_{17} = \infty$ | | | |
| | $d_{17} = 0.7016$ | $n_9 = 1.84666$ | $\nu_9 = 23.78$ |
| $r_{18} = 18.4298$ (A) | | | |
| | $d_{18} = 1.87$ | | |
| $r_{19} = \infty$ | | | |
| | $d_{19} = 10.5$ | $n_{10} = 1.54869$ | $\nu_{10} = 45.55$ |
| $r_{20} = \infty$ | | | |
| (The 6th surface) | $p = 1$ | $A_4 = 0.10722 \times 10^{-3}$ | |
| | | $A_6 = -0.95978 \times 10^{-5}$ | |
| (The 18th surface) | $p = 1$ | $A_4 = 0.7507 \times 10^{-4}$ | |

-continued

| | | |
|---|---|---|
| | $A_6 = -0.50025 \times 10^{-6}$ | |
| f | 18.425 | 28.41 |
| $Z_1$ | 4.892 | 3.792 |
| $Z_2$ | 1.425 | 6.093 |
| $Z_3$ | 4.068 | 0.5 |
| F/ | 3.45 | 5.12 |
| IH | 2.2 | 3.18 |
| $f_B$ | 3.5 | 3.5 |

$Z \to 1.485$
$\phi_{3W} = -7739 \times 10^{-5}$
$\phi_{3T} = -14265 \times 10^{-5}$
$SA - - = -11040 \times 10^{-5}$
$|\phi_{3T}| - |\phi_{3W}| = 6526 \times 10^{-5}$
$0.8|(Z-1)SA31| = 4284 \times 10^{-5}$
$\phi_{5W} = 7772 \times 10^{-5}$
$\phi_{5T} = 11893 \times 10^{-5}$
$SA51 = 8096 \times 10^{-5}$
$|\phi_{5T}| - |\phi_{5W}| = 4121 \times 10^{-5}$
$0.8|(Z-1)SA51| = 3141 \times 10^{-5}$
$|\phi_{3T}| + |\phi_{5T}| - |\phi_{3W}| - |\phi_{5W}| = 10647 \times 10^{-5}$
$0.8(Z-1)(|SA31| + |SA51|) = 7425 \times 10^{-5}$ FIGS. 17 and 18 are graphs showing the aberration characteristics at the wide and tele positions, respectively. Owing to the aspherical surface $r_6$, zonal aberration is large.

FIG. 19 is a sectional view of the lens arrangement of a fourth embodiment of the present invention. This embodiment is a two-unit zoom lens which comprises a lens unit $G_1$ of a negative refractive power mainly functioning as a compensator and a lens unit $G_2$ of a positive refractive power mainly functioning as a variator and includes three cemented lenses for preventing the variation of chromatic aberration. In this embodiment, a large amount of spherical aberration is caused by the most
image side surface of the lens unit $G_1$. The aspherical surface provided at the most object side surface is to correct the upper coma at the tele position owing to a strong divergent effect in the lens unit $G_1$. The lens data are as follows:

| | | | |
|---|---|---|---|
| $r_1 = \infty$ (stop) | | | |
| | $d_1 = 0.3$ | | |
| $r_2 = \infty$ | | | |
| | $d_2 = 1.0$ | $n_1 = 1.51633$ | $\nu_1 = 64.15$ |
| $r_3 = \infty$ | | | |
| | $d_3 = 3.5$ | | |
| $r_4 = \infty$ | | | |
| | $d_4 = 1.0$ | $n_2 = 1.51633$ | $\nu_2 = 64.15$ |
| $r_5 = \infty$ | | | |
| | $d_5 = 0.5$ | | |
| $r_6 = \infty$ | | | |
| | $d_6 = 1.0$ | $n_3 = 1.79952$ | $\nu_3 = 42.24$ |
| $r_7 = \infty$ | | | |
| | $d_7 = Z_1$ (variable) | | |
| $r_8 = 9.4521$ (A) | | | |
| | $d_8 = 2.021$ | $n_4 = 1.51633$ | $\nu_4 = 64.15$ |
| $r_9 = -12.4347$ | | | |
| | $d_9 = 1.3127$ | $n_5 = 1.54869$ | $\nu_5 = 45.55$ |
| $r_{10} = 54.7151$ | | | |
| | $d_{10} = 0.5$ | | |
| $r_{11} = \infty$ | | | |
| | $d_{11} = 3.5$ | $n_6 = 1.54869$ | $\nu_6 = 45.55$ |
| $r_{12} = \infty$ | | | |
| | $d_{12} = 1.0$ | | |
| $r_{13} = -18.22$ | | | |
| | $d_{13} = 0.8597$ | $n_7 = 1.6968$ | $\nu_7 = 55.52$ |
| $r_{14} = 6.3742$ | | | |
| | $d_{14} = 1.2921$ | $n_8 = 1.883$ | $\nu_8 = 40.78$ |
| $r_{15} = 9.3375$ | | | |

-continued

| | $d_{15} = Z_2$ (variable) | | |
|---|---|---|---|
| $r_{16} = \infty$ | | | |
| | $d_{16} = 2.827$ | $n_9 = 1.72916$ | $\nu_9 = 54.68$ |
| $r_{17} = -21.9151$ | | | |
| | $d_{17} = 0.2$ | | |
| $r_{18} = 32.5576$ | | | |
| | $d_{18} = 2.5$ | $n_{10} = 1.72916$ | $\nu_{10} = 54.68$ |
| $r_{19} = -86.3844$ | | | |
| | $d_{19} = 0.2$ | | |
| $r_{20} = 12.4283$ | | | |
| | $d_{20} = 2.9503$ | $n_{11} = 1.72916$ | $\nu_{11} = 54.68$ |
| $r_{21} = -65.1394$ | | | |
| | $d_{21} = 0.97$ | $n_{12} = 1.84666$ | $\nu_{12} = 23.78$ |
| $r_{22} = 18.0705$ (A) | | | |

| (The 8th surface) | $p = 1$ | $A_4 = 0.78326 \times 10^{-5}$ |
|---|---|---|
| (The 22th surface) | $p = 1$ | $A_4 = -0.35872 \times 10^{-4}$ |
| f | 18.454 | 28.84 |
| $Z_1$ | 0.654 | 6.240 |
| $Z_2$ | 9.191 | 1.056 |
| F/ | 3.45 | 5.12 |
| IH | 2.2 | 3.18 |
| $f_B$ | 13.051 | 15.598 |

Figure 20:
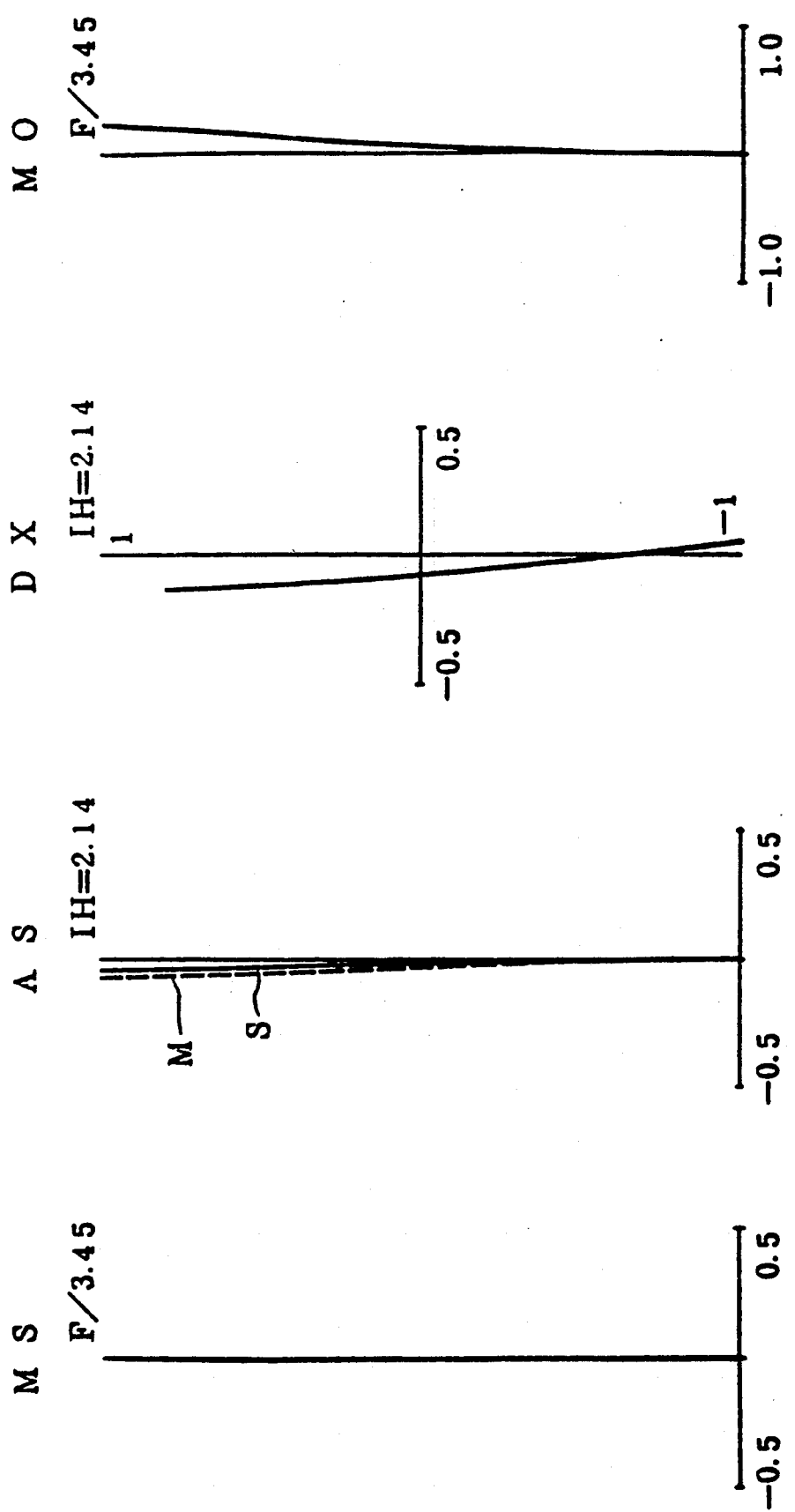
FIGS. 20 and 21 are graphs showing the aberration characteristics of the fourth embodiment.
Figure 21:
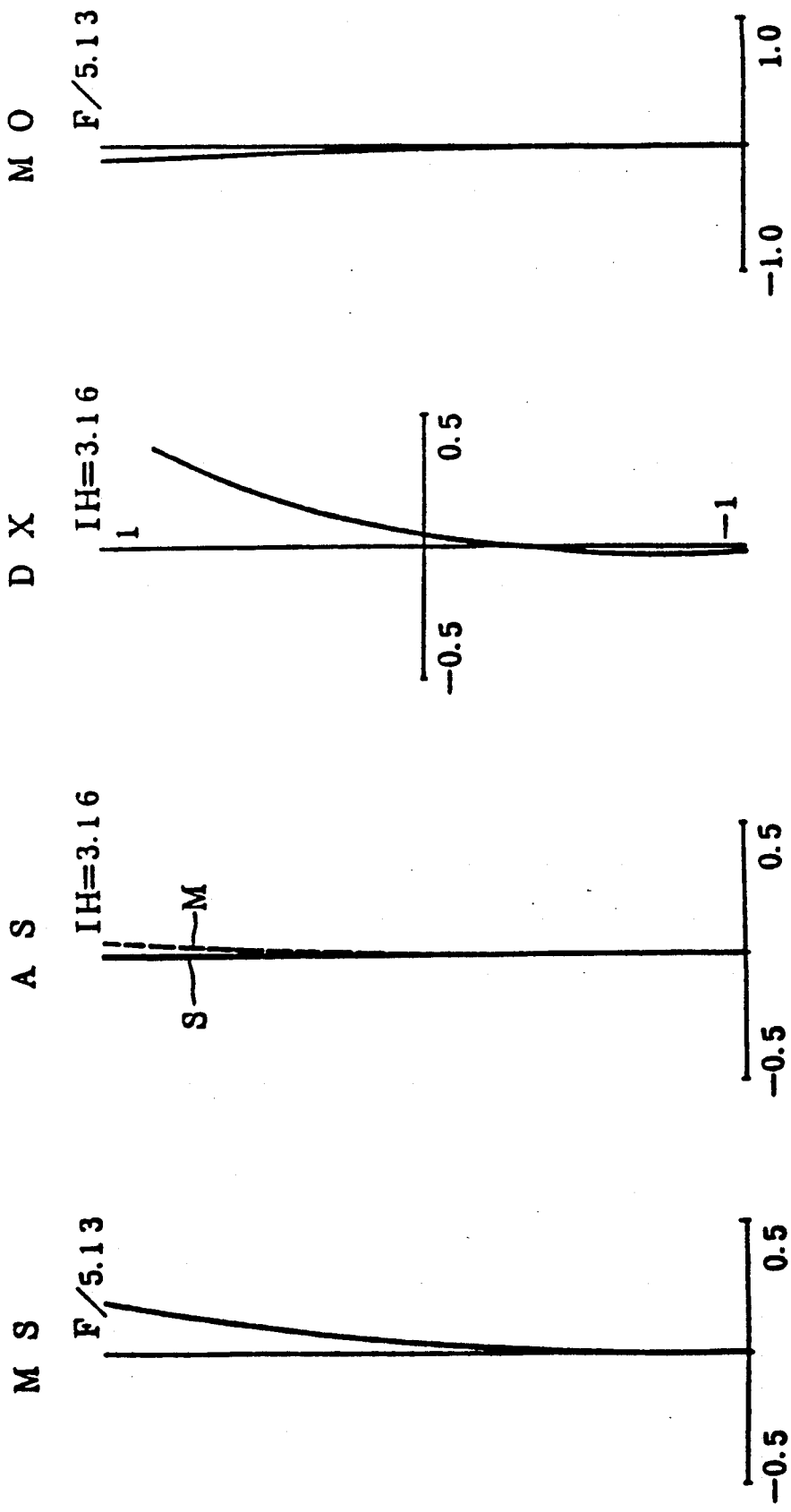

$Z = 1.563$
$\phi_{3W} = -296 \times 10^{-5}$
$\phi_{3T} = 1503 \times 10^{-5}$
$SA31 = 1796 \times 10^{-5}$
$|\phi_{3T}| - |\phi_{3W}| = 1207 \times 10^{-5}$
$0.8|(Z-1)SA31| = 697 \times 10^{-5}$ $\phi_{5W} = 258 \times 10^{-5}$
$\phi_{5T} = 391 \times 10^{-5}$
$SA51 = 287 \times 10^{-5}$
$|\phi_{3T}| + |\phi_{5T}| - |\phi_{3W}| - |\phi_{5W}| = 1340 \times 10^{-5}$
$0.8(Z-1)(|SA31| + |SA51|) = 680 \times 10^{-5}$ FIGS. 20 and 21 are graphs showing the aberration characteristics at the wide and tele positions, respectively.

Figure 22:
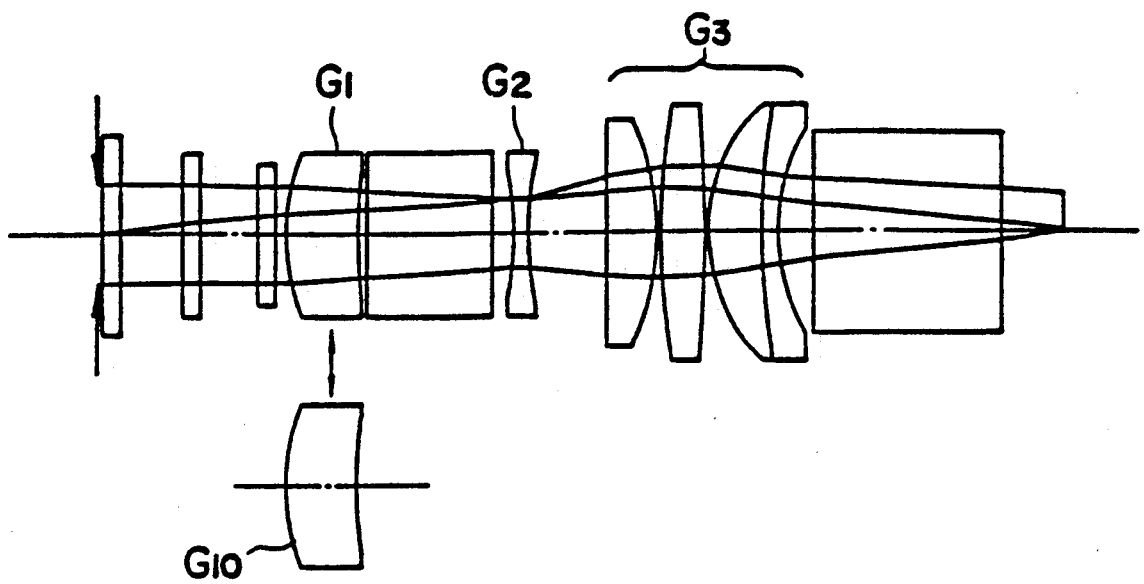
FIG. 22 (A) and 22 (B) are sectional view of a lens system according to a fifth embodiment of the present invention.
Figure 22:
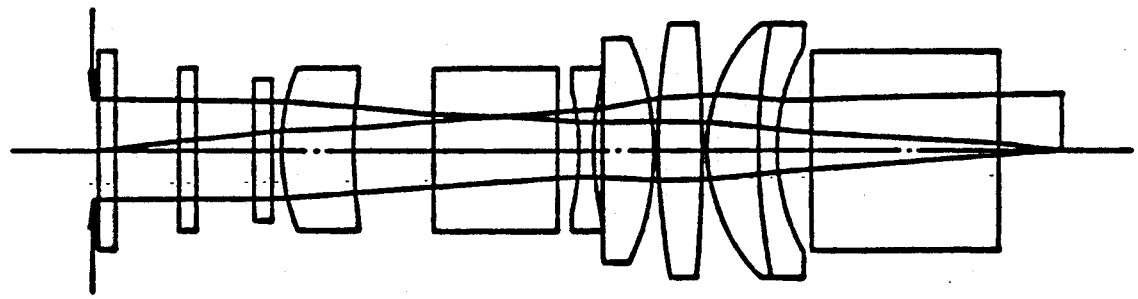

FIG. 22 is a sectional view of the lens arrangement of a fifth embodiment of the present invention which has the same structure as the first embodiment. In this embodiment, the lens unit $G_1$ is interchangeable with a different lens unit $G_{10}$ without changing the paraxial relationship (that is, the positional relationship between the object and image points is independent of the interchange), and the amount of spherical aberration can be varied by the interchange. When the lens unit $G_{10}$ is placed in the optical path, the amount of spherical aberration caused by the entire system is small and the spurious signal eliminating effect is substantially zero. In this state, images of high resolution can be obtained when the amount of spurious signals is small, for example, in the case of usual image taking, use with a rigid endoscope, etc. On the other hand, when the lens unit $G_1$ is inserted in the optical path, a large amount of spherical aberration is caused so that the spurious signal eliminating effect can be obtained.

The lens data are presented below. ($r_8$, $r_9$) constitutes the lens unit $G_1$ and ($r_{8'}$, $r_{9'}$) comprises the lens unit $G_{10}$.

| $r_1 = \infty$ (stop) | | | |
|---|---|---|---|
| | $d_1 = 0.3$ | | |
| $r_2 = \infty$ | | | |
| | $d_2 = 1.0$ | $n_1 = 1.51633$ | $\nu_1 = 64.15$ |
| $r_3 = \infty$ | | | |
| | $d_3 = 3.5$ | | |
| $r_4 = \infty$ | | | |
| | $d_4 = 1.0$ | $n_2 = 1.51633$ | $\nu_2 = 64.15$ |
| $r_5 = \infty$ | | | |
| | $d_5 = 3.2$ | | |
| $r_6 = \infty$ | | | |
| | $d_6 = 1.0$ | $n_3 = 1.79952$ | $\nu_3 = 42.24$ |
| $r_7 = \infty$ | | | |
| | $d_7 = Z_1$ (variable) | | |
| $r_8 = 11.8473$ (A) | | | |
| | $d_8 = 3.9754$ | $n_4 = 1.51633$ | $\nu_4 = 64.15$ |
| $r_9 = 31.4715$ | | | |
| $r_{8'} = 11.8423$ | | | |
| | $d_{8'} = 3.9754$ | $n_{4'} = 1.51633$ | $\nu_{4'} = 64.15$ |
| $r_{9'} = 31.4715$ | | | |
| | $d_9 = Z_2$ (variable) | | |
| $r_{10} = \infty$ | | | |
| | $d_{10} = 6.9537$ | $n_5 = 1.54869$ | $\nu_5 = 45.55$ |
| $r_{11} = \infty$ | | | |
| | $d_{11} = 1.2$ | | |
| $r_{12} = -15.8268$ | | | |
| | $d_{12} = 0.8$ | $n_6 = 1.883$ | $\nu_6 = 40.78$ |
| $r_{13} = 19.5676$ | | | |
| | $d_{13} = Z_3$ (variable) | | |
| $r_{14} = \infty$ | | | |
| | $d_{14} = 2.827$ | $n_7 = 1.72916$ | $\nu_7 = 54.68$ |
| $r_{15} = -14.559$ | | | |
| | $d_{15} = 0.2$ | | |
| $r_{16} = 40.627$ | | | |
| | $d_{16} = 2.5$ | $n_8 = 1.72916$ | $\nu_8 = 54.68$ |
| $r_{17} = -70.113$ | | | |
| | $d_{17} = 0.2$ | | |
| $r_{18} = 9.56$ | | | |
| | $d_{18} = 2.9503$ | $n_9 = 1.72916$ | $\nu_9 = 54.68$ |
| $r_{19} = 38.3084$ | | | |
| | $d_{19} = 0.97$ | $n_{10} = 1.84666$ | $\nu_{10} = 23.78$ |
| $r_{20} = 11.3011$ | | | |
| | $d_{20} = 1.87$ | | |
| $r_{21} = \infty$ | | | |
| | $d_{21} = 10.5$ | $n_{11} = 1.54869$ | $\nu_{11} = 45.55$ |

-continued

| | | |
|---|---|---|
| $r_{22} = \infty$ | | |
| (The 8th surface) | $p = 1$ | $A_4 = 0.11857 \times 10^{-4}$ |
| | | $A_6 = 0.25 \times 10^{-6}$ |
| f | 18.577 | 28.763 |
| $Z_1$ | 0.566 | 0.507 |
| $Z_2$ | 0.50 | 4.433 |
| $Z_3$ | 4.374 | 0.50 |
| F/ | 3.45 | 5.12 |
| IH | 2.2 | 3.18 |
| $f_B$ | 3.49 | 3.49 |

$Z = 1.485$
$\phi_{3W'} = 231 \times 10^{-5}$
$\phi_{3T'} = -632 \times 10^{-5}$
$SA31' = -2189 \times 10^{-5}$
$|\phi_{3T'}| - |\phi_{3W'}| = 401 \times 10^{-5}$
$0.8|(Z-1)SA31'| = 850 \times 10^{-5}$
$\phi_{5W'} = 356 \times 10^{-5}$
$\phi_{5T'} = 542 \times 10^{-5}$
$SA51' = 362 \times 10^{-5}$
$|\phi_{3T'}| + |\phi_{5T'}| - |\phi_{3W'}| - |\phi_{5W'}| = 497 \times 10^5$
$0.8(Z-1)(|SA31'| + |SA51'|) = 308 \times 10^{-5}$
$\phi_{3W} = -660 \times 10^{-5}$
$\phi_{3T} = -1955 \times 10^{-5}$
$SA31 = -3074 \times 10^{-5}$
$|\phi_{3T}| - |\phi_{3W}| = 1295 \times 10^{-5}$
$0.8|(Z-1)SA31| = 1193 \times 10^{-5}$
$\phi_{5W} = 529 \times 10^{-5}$
$\phi_{5T} = 822 \times 10^{-5}$
$SA51 = 549 \times 10^{-5}$
$|\phi_{3T}| + |\phi_{5T}| - |\phi_{3W}| - |\phi_{5W}| = 1331 \times 10^{-5}$
$0.8(Z-1)(|SA31| + |SA51|) = 375 \times 10^{-5}$ In the above, $\phi_{3T'}$, $\phi_{3W'}$ and SA31' are the third-order coefficients of spherical aberration of the entire system at the tele and wide positions and the lens unit $G_{10}$, respectively when the lens unit $G_{10}$ is inserted in the optical path. It is apparent from the given data that equation (19) does not hold when the lens unit $G_{10}$ is inserted in the optical path.

FIGS. 23 and 24 are graphs showing the aberration characteristics at the wide and tele positions, respectively when the lens unit $G_1$ is inserted in the optical path, and FIGS. 25 and 26 are graphs showing the aberration characteristics at the wide and tele positions, respectively when the lens unit $G_1$ is inserted in the optical path. While the absolute value of spherical aberration is small in FIGS. 23 and 24, spherical aberration in FIGS. 25 and 26 becomes large with the shift from the wide to tele position, which shows the features of the present invention.

Figure 27A:
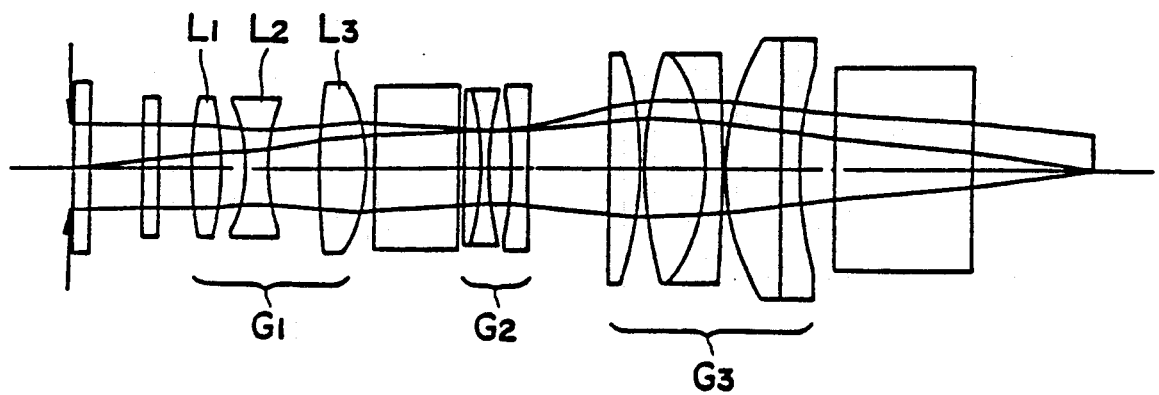
FIG. 27 (A) and 27 (B) are sectional view of a lens system according to a sixth embodiment of the present invention.
Figure 27B:
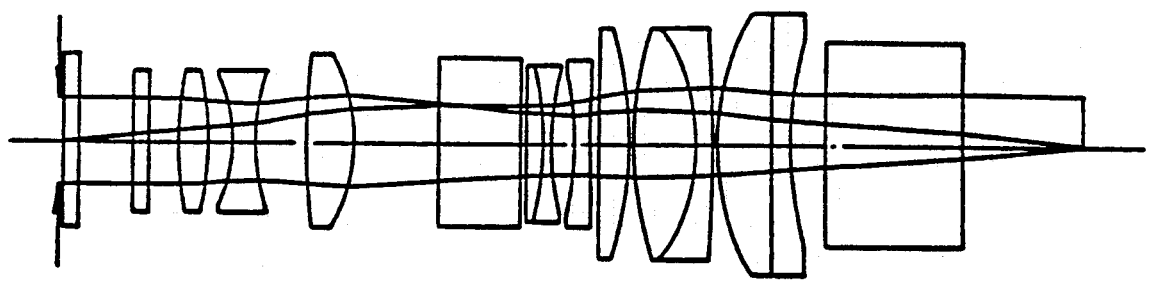
Figure 32:
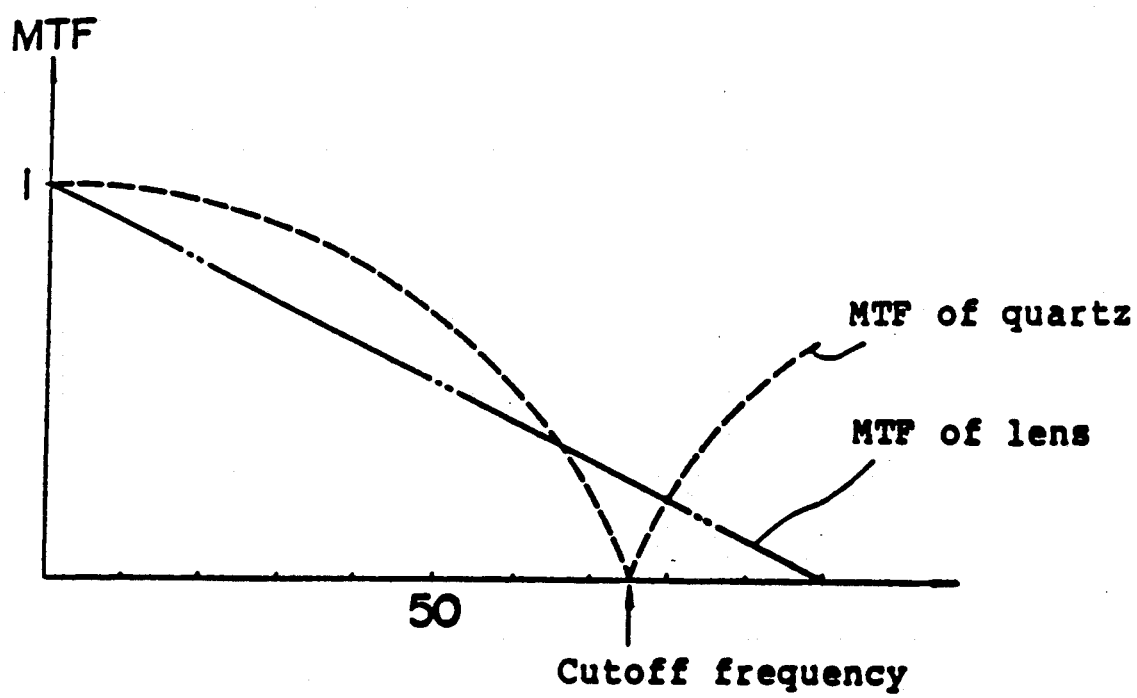
FIG. 32 is a graph showing the spatial frequency response of an imaging optical system according to the present invention.

FIG. 27 is a sectional view of the lens arrangement of a sixth embodiment of the present invention. In this embodiment, the lens unit $G_1$ is of the triplet type. The amount of the spherical aberration caused by the lens unit $G_1$ can be continuously varied by varying the distances between the lenses of the lens unit $G_1$.

When this embodiment with such a structure is used as an image taking lens for an endoscopic television camera, it is possible to cause the optimum amount of spherical aberration corresponding to the various endoscopes for eliminating the spurious signals so that a television camera having a wide range of use can be obtained. In this embodiment, the lens unit $G_1$ comprises three lenses $L_1$, $L_2$ and $L_3$ and the distance between the lenses $L_1$ and $L_2$ is varied to vary the height of the rays incident on the front surface of the lens $L_2$ for adjusting the magnitude of spherical aberration. The resulting variation of the magnification of the lens unit $G_1$ is compensated by the lens $L_3$. The lens data are presented below.

| | | | |
|---|---|---|---|
| $r_1 = \infty$ (stop) | $d_1 = 0.3$ | | |
| $r_2 = \infty$ | $d_2 = 1.0$ | $n_1 = 1.51633$ | $\nu_1 = 64.15$ |
| $r_3 = \infty$ | $d_3 = 3.5$ | | |
| $r_4 = \infty$ | $d_5 = 1.0$ | $n_2 = 1.51633$ | $\nu_2 = 64.15$ |
| $r_5 = \infty$ | $d_5 = Z_1$ (variable) | | |
| $r_6 = 23.9554$ | $d_6 = 1.9496$ | $n_3 = 1.51633$ | $\nu_3 = 64.15$ |
| $r_7 = -17.648$ | $d_7 = Z_2$ (variable) | | |
| $r_8 = -9.8618$ | $d_8 = 1.5$ | $n_4 = 1.57845$ | $\nu_4 = 41.52$ |
| $r_9 = 14.7709$ | $d_9 = 3.224$ | | |
| $r_{10} = 53.2658$ | $d_{10} = 3.0$ | $n_5 = 1.58913$ | $\nu_5 = 60.97$ |
| $r_{11} = -11.0619$ | $d_{11} = Z_3$ (variable) | | |
| $r_{12} = \infty$ | $d_{12} = 5.3631$ | $n_6 = 1.54869$ | $\nu_6 = 45.55$ |
| $r_{13} = \infty$ | $d_{13} = 0.4$ | | |
| $r_{14} = \infty$ | $d_{14} = 1.1$ | $n_7 = 1.84666$ | $\nu_7 = 23.78$ |
| $r_{15} = -18.0$ | $d_{15} = 0.5$ | $n_8 = 1.816$ | $\nu_8 = 46.62$ |
| $r_{16} = 20.4345$ | $d_{16} = 1.5$ | | |
| $r_{17} = -20.6834$ | $d_{17} = 1.0$ | $n_9 = 1.816$ | $\nu_9 = 46.62$ |
| $r_{18} = 262.0301$ | $d_{18} = Z_4$ (variable) | | |
| $r_{19} = \infty$ | $d_{19} = 2.0$ | $n_{10} = 1.72916$ | $\nu_{10} = 54.68$ |
| $r_{20} = -22.4171$ | $d_{20} = 0.24$ | | |
| $r_{21} = 25.2778$ | $d_{21} = 4.0$ | $n_{11} = 1.6968$ | $\nu_{11} = 55.52$ |
| $r_{22} = -12.2403$ | $d_{22} = 1.0$ | $n_{12} = 1.69895$ | $\nu_{12} = 30.12$ |
| $r_{23} = -130.2862$ | $d_{23} = 0.24$ | | |
| $r_{24} = 16.2935$ | $d_{24} = 3.5404$ | $n_{13} = 1.72916$ | $\nu_{13} = 54.68$ |
| $r_{25} = \infty$ | $d_{25} = 1.164$ | $n_{14} = 1.863$ | $\nu_{14} = 41.53$ |
| $r_{26} = 24.3054$ | $d_{26} = 2.244$ | | |
| $r_{27} = \infty$ | $d_{27} = 8.9583$ | $n_{15} = 1.54869$ | $\nu_{15} = 45.55$ |
| $r_{28} = \infty$ | | | |

| f | 18.484 | | 28.256 | |
|---|---|---|---|---|
| $Z_1$ | 0.897 | 2.157 | 0.655 | 1.915 |
| $Z_2$ | 0.75 | 1.5 | 0.75 | 1.5 |
| $Z_3$ | 2.509 | 0.5 | 7.414 | 5.405 |
| $Z_4$ | 5.263 | 5.263 | 0.6 | 0.6 |

-continued

| F/ | 3.45 | 5.13 |
|---|---|---|
| IH | 2.2 | 3.18 |
| $f_B$ | 7.749 | 7.749 |

$Z = 1.485$
$\phi_{3W} = 128 \times 10^{-5}$    $\phi_{3W}' = -720 \times 10^{-5}$
$\phi_{3T} = 1166 \times 10^{-5}$    $\phi_{3T}' = -92 \times 10^{-5}$
$SA31 = 418 \times 10^{-5}$    $SA31' = -431 \times 10^{-5}$
$|\phi_{3T}| - |\phi_{3W}| = 1038 \times 10^{-5}$
$|\phi_{3T}'| - |\phi_{3W}'| = -628 \times 10^{-5}$
$0.8|(Z-1)SA31| = 162 \times 10^{-5}$
$0.8|(Z-1)SA31'| = 167 \times 10^{-5}$ In the above table, the values of $Z_1$, $Z_2$, $Z_3$ and $Z_4$ for each focal length are listed in such a manner that the values in the left column are of the state in which a large amount of spherical aberration is caused and the values in the right column are of the state in which spherical aberration is suppressed. FIGS. 28 and 29 are graphs showing the aberration characteristics at the wide and tele positions, respectively when the amount of spherical aberration is large. FIGS. 30 and 31 are graphs showing the aberration characteristics at the wide and tele positions, respectively when spherical aberration is suppressed.

Since the optical system of each embodiment includes the optical low-pass filter Q formed by a quartz plate, the MTF of the imaging optical system as a whole is the composition of the MTF of the lens system and the MTF of the optical low-pass filter so that a better effect of spurious signal elimination can be obtained. Especially, since the optical low-pass filter is located on the object side of the lens unit $G_2$ which contributes to the variation of magnification, a relationship established between the MTFs of the optical low-pass filter and the lens system at, for example, the wide position is not broken off by varying the magnification, but substantially maintained.

What is claimed is:

1. An imaging optical system comprising an imaging lens system for forming an image of an object on a given image plane, the imaging lens system comprising a varifocal lens portion for allowing the imaging lens system as a whole to have different magnifications without changing the positional relationship between the object and the image plane, and a front lens portion arranged on the object side of the varifocal lens portion, the imaging lens system satisfying the following condition:

$$|\phi_{3T}| - |\phi_{3W}| \geq 0.8|(Z-1)SA31|$$

where Z is the ratio of the maximum value to the minimum value of the magnification of the imaging lens system; SA31 is the third-order coefficient of spherical aberration of the front lens portion; $|\phi_{3T}|$ is the sum of the third-order coefficients of spherical aberration of the respective lens surfaces of the imaging lens system in the state of the maximum magnification; and $|\phi_{3W}|$ is the sum of the third-order coefficients of spherical aberration of the respective lens surfaces of the imaging lens system in the state of the minimum magnification.

2. An imaging optical system comprising an imaging lens system for forming an image of an object on a given image plane, the imaging lens system comprising a varifocal lens portion for allowing the imaging lens system as a whole to have different magnifications without changing the positional relationship between the object and the image plane, and a front lens portion arranged on the object side of the varifocal lens portion, the imaging lens system satisfying the following condition:

$$|\phi_{3T}| - |\phi_{3W}| \geq |(Z-1)SA31|$$

where Z is the ratio of the maximum value to the minimum value of the magnification of the imaging lens system; SA31 is the third-order coefficient of spherical aberration of the front lens portion; $|\phi_{3T}|$ is the sum of the third-order coefficients of spherical aberration of the respective lens surfaces of the imaging lens system in the state of the maximum magnification; and $|\phi_{3W}|$ is the sum of the third-order coefficients of spherical aberration of the respective lens surfaces of the imaging lens system in the state of the minimum magnification.

3. An imaging optical system comprising an imaging lens system for forming an image of an object on a given image plane, the imaging lens system comprising a varifocal lens portion for allowing the imaging lens system as a whole to have different magnifications without changing the positional relationship between the object and the image plane, and a front lens portion arranged on the object side of the varifocal lens portion, the imaging lens system satisfying the following condition:

$$|\phi_{5T}| - |\phi_{5W}| \geq 0.8|(Z-1)SA51|$$

where Z is the ratio of the maximum value to the minimum value of the magnification of the imaging lens system; SA51 is the fifth-order coefficient of spherical aberration of the front lens portion; $|\phi_{5T}|$ is the sum of the fifth-order coefficients of spherical aberration of the respective lens surfaces of the imaging lens system in the state of the maximum magnification; and $|\phi_{5W}|$ is the sum of the fifth-order coefficients of spherical aberration of the respective lens surfaces of the imaging lens system in the state of the minimum magnification.

4. An imaging optical system comprising an imaging lens system for forming an image of an object on a given image plane, the imaging lens system comprising a varifocal lens portion for allowing the imaging lens system as a whole to have different magnifications without changing the positional relationship between the object and the image plane, and a front lens portion arranged on the object side of the varifocal lens portion, the imaging lens system satisfying the following condition:

$$|\phi_{5T}| - |\phi_{5W}| \div |(Z-1)SA51|$$

where Z is the ratio of the maximum value to the minimum value of the magnification of the imaging lens system; SA51 is the fifth-order coefficient of spherical aberration of the front lens portion; $|\phi_{5T}|$ is the sum of the fifth-order coefficients of spherical aberration of the respective lens surfaces of the imaging lens system in the state of the maximum magnification; and $|\phi_{5W}|$ is the sum of the fifth-order coefficients of spherical aberration of the respective lens surfaces of the imaging lens system in the state of the minimum magnification.

5. An imaging optical system comprising an imaging lens system for forming an image of an object on a given image plane, the imaging lens system comprising a varifocal lens portion for allowing the imaging lens system as a whole to have different magnifications without changing the positional relationship between the object and the image plane, and a front lens portion arranged on the object side of the varifocal lens portion, the imaging lens system satisfying the following condition:

$$|\phi_{3T}|+|\phi_{5T}|-|\phi_{3W}|-|\phi_{5W}|$$
$$\geq 0.8(Z-1)(|SA31|+|SA51|)$$

where Z is the ratio of the maximum value to the minimum value of the magnification of the imaging lens system; SA31 is the third-order coefficient of spherical aberration of the front lens portion; SA51 is the fifth-order coefficient of spherical aberration of the front lens portion; $|\phi_{3T}|$ is the sum of the third-order coefficients of spherical aberration of the respective lens surfaces of the imaging lens system in the state of the maximum magnification; $|\phi_{5T}|$ is the sum of the fifth-order coefficients of spherical aberration of the respective lens surfaces of the imaging lens system in the state of the maximum magnification; $|\phi_{3W}|$ is the sum of the third-order coefficients of spherical aberration of the respective lens surfaces of the imaging lens system in the state of the minimum magnification; and $|\phi_{5W}|$ is the sum of the fifth-order coefficients of spherical aberration of the respective lens surfaces of the imaging lens system in the state of the minimum magnification.

6. An imaging optical system comprising an imaging lens system for forming an image of an object on a given image plane, the imaging lens system comprising a varifocal lens portion for allowing the imaging lens system as a whole to have different magnifications without changing the positional relationship between the object and the image plane, and a front lens portion arranged on the object side of the varifocal lens portion, the imaging lens system satisfying the following condition:

$$|\phi_{3T}|+|\phi_{5T}|-|\phi_{3W}|-|\phi_{5W}|$$
$$\geq (Z-1)(|SA31|+|SA51|)$$

where Z is the ratio of the maximum value to the minimum value of the magnification of the imaging lens system; SA31 is the third-order coefficient of spherical aberration of the front lens portion; SA51 is the fifth-order coefficient of spherical aberration of the front lens portion; $|\phi_{3T}|$ is the sum of the third-order coefficients of spherical aberration of the respective lens surfaces of the imaging lens system in the state of the maximum magnification; $|\phi_{5T}|$ is the sum of the fifth-order coefficients of spherical aberration of the respective lens surfaces of the imaging lens system in the state of the maximum magnification; $|\phi_{3W}|$ is the sum of the third-order coefficients of spherical aberration of the respective lens surfaces of the imaging lens system in the state of the minimum magnification; and $|\phi_{5W}|$ is the sum of the fifth-order coefficients of spherical aberration of the respective lens surfaces of the imaging lens system in the state of the minimum magnification.

7. The imaging optical system of claim 1 or 3, in which the the front lens portion has a positive refractive power and is fixed on the optical axis; the varifocal lens portion has a negative refractive power and is movable along the optical axis; and the imaging lens system further comprises a rear lens portion having a positive refractive power and which is arranged on the image side of the varifocal lens portion.

8. The imaging optical system of claim 1 or 3, in which the the front lens portion has a negative refractive power and is movable along the optical axis; and the varifocal lens portion has a positive refractive power and is movable along the optical axis.

9. The imaging optical system of claim 7, in which the following condition is satisfied:

$$1/\sqrt{Z} < |\beta_V| < \sqrt{Z}$$

where $\beta_V$ is the magnification of the varifocal lens portion.

10. The imaging optical system of claim 8, in which the following condition is satisfied:

$$1/\sqrt{Z} < |\beta_V| < \sqrt{Z}$$

where $\beta_V$ is the magnification of the varifocal lens portion.

11. The imaging optical system of claim 9, in which when the imaging lens system is in the state of its minimum magnification, the absolute value of the third-order coefficient of spherical aberration of the front lens portion is larger than the absolute value of the sum of the third-order coefficient of spherical aberration of the varifocal lens portion and the third-order coefficient of spherical aberration of the varifocal lens portion.

12. The imaging optical system of claim 10, in which when the imaging lens system is in the state of its minimum magnification, the absolute value of the third-order coefficient of spherical aberration of the front lens portion is larger than the absolute value of the third-order coefficient of spherical aberration of the varifocal lens portion.

13. The imaging optical system of claim 1 or 3, in which the signs of $\phi_{3W}$ and $\phi_{3T}$ are the same.

14. The imaging optical system of claim 1 or 3 in which an aperture stop is arranged on the object side with respect to the varifocal lens portion.

15. The imaging optical system of claim 1 or 3, in which the front lens portion has an aspherical surface.

16. The imaging optical system of claim 15, in which the deviation of the aspherical surface from its reference spherical surface monotonically increases as the aspherical surface goes away from the optical axis.

17. The imaging optical system of claim 15, in which the deviation of the aspherical surface from its reference spherical surface monotonically increases as the aspherical surface goes away from the optical axis to a predetermined distance, and the deviation of the aspherical surface from its reference spherical surface monotonically decreases as the aspherical surface further goes away from the predetermined distance.

18. The imaging optical system of claim 1 or 3, in which the front lens portion has a positive refractive power and is movable along the optical axis; the varifocal lens portion has a negative refractive power and is movable along the optical axis; and the imaging lens system further comprises a rear lens portion having a positive refractive power and arranged on the image side of the varifocal lens portion.

19. The imaging optical system of claim 1 or 3 in which the front lens portion is interchangeable with a different lens unit without changing the paraxial relationship with the varifocal lens portion.

20. The imaging optical system of claim 19, in which the different lens unit satisfies none of said conditions.

21. The imaging optical system of claim 1 or 3 in which the front lens portion comprises a plurality of lens elements, and the amount of spherical aberration can be varied by varying the distance between these lens elements.

* * * * *